Nov. 10, 1936.  G. F. YAGER ET AL  2,060,158
METALWORKING MACHINE
Filed Oct. 24, 1932  19 Sheets-Sheet 1

Inventors
GEORGE F. YAGER
OLIVER J. HEATH

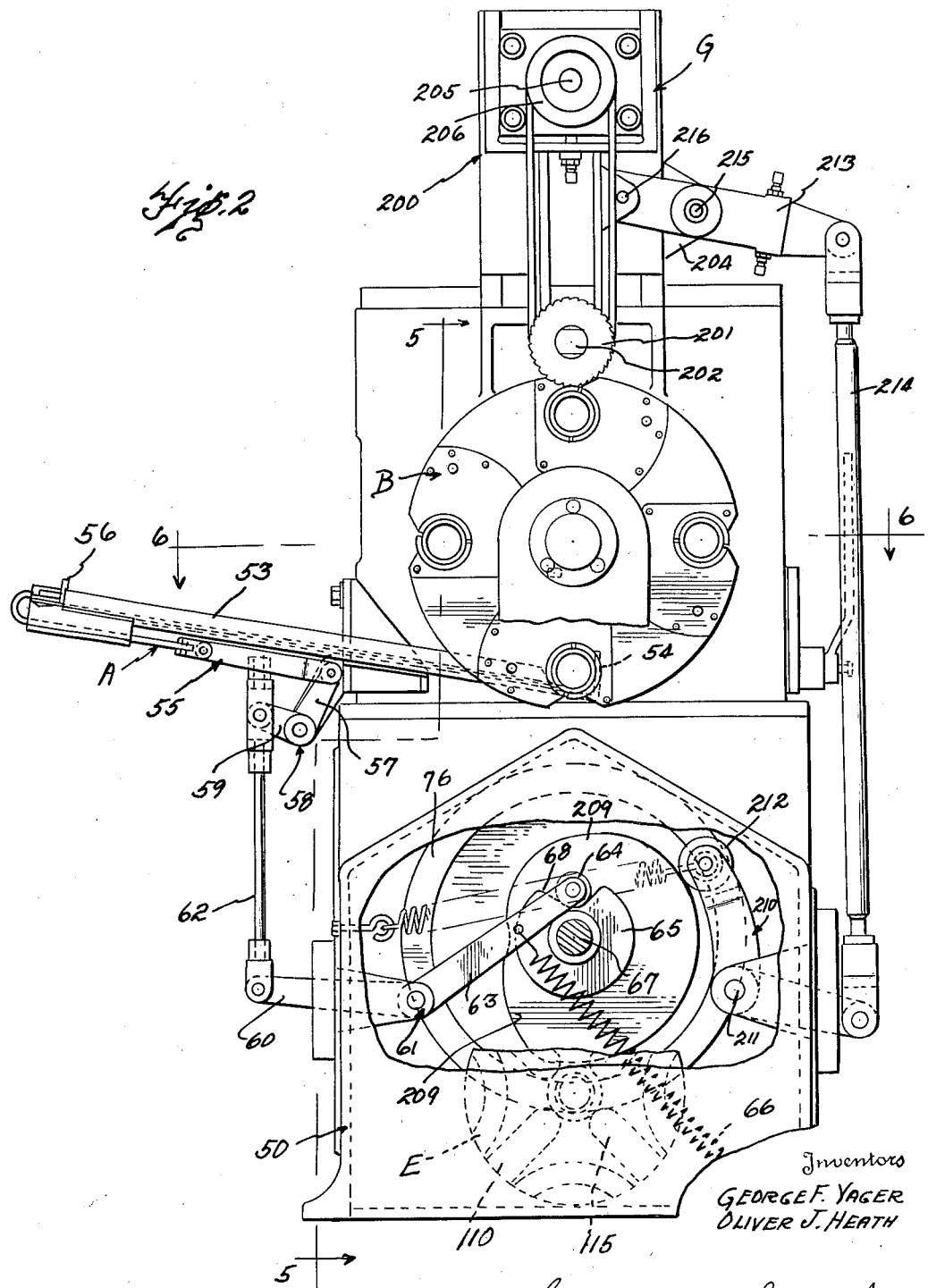

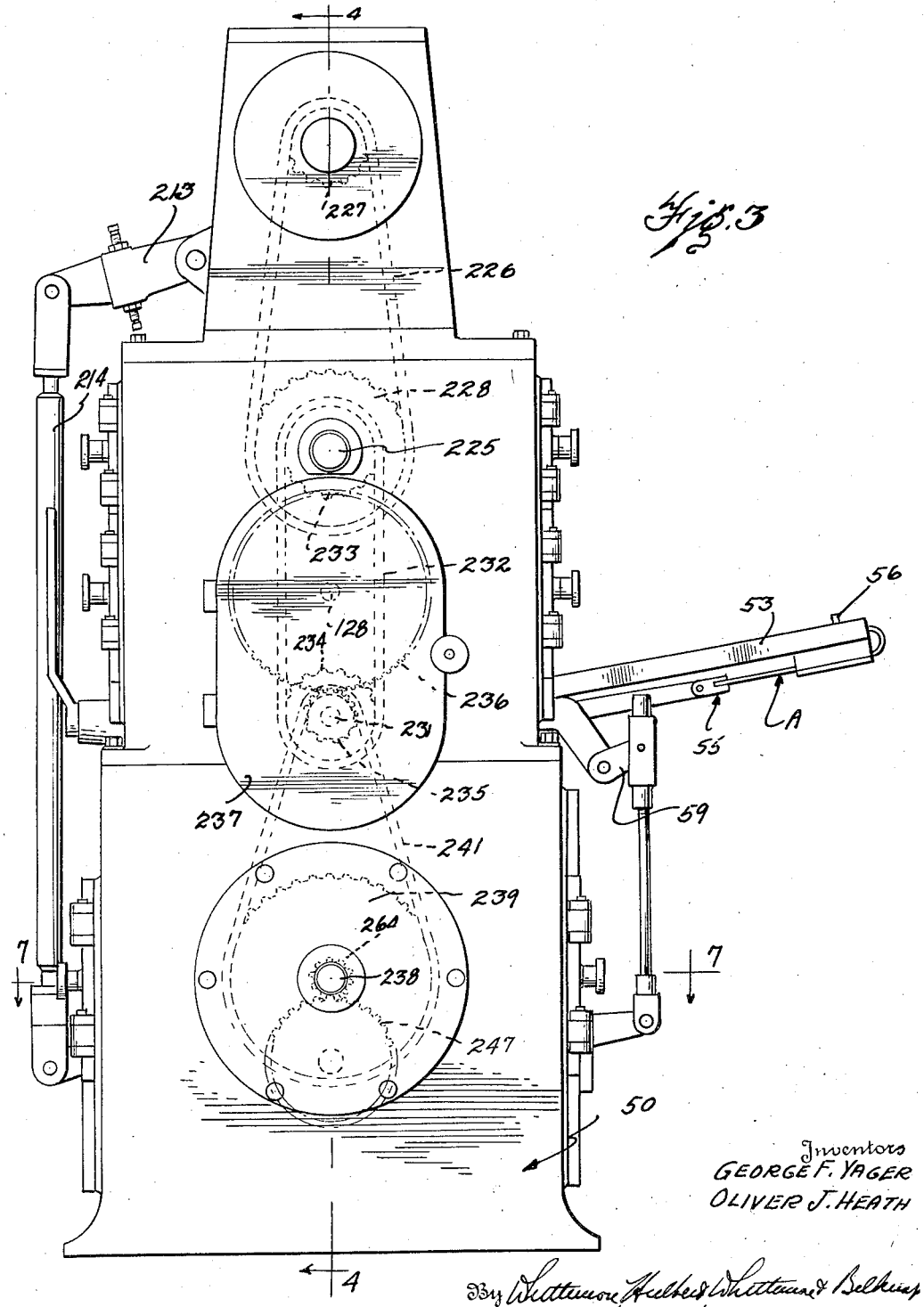

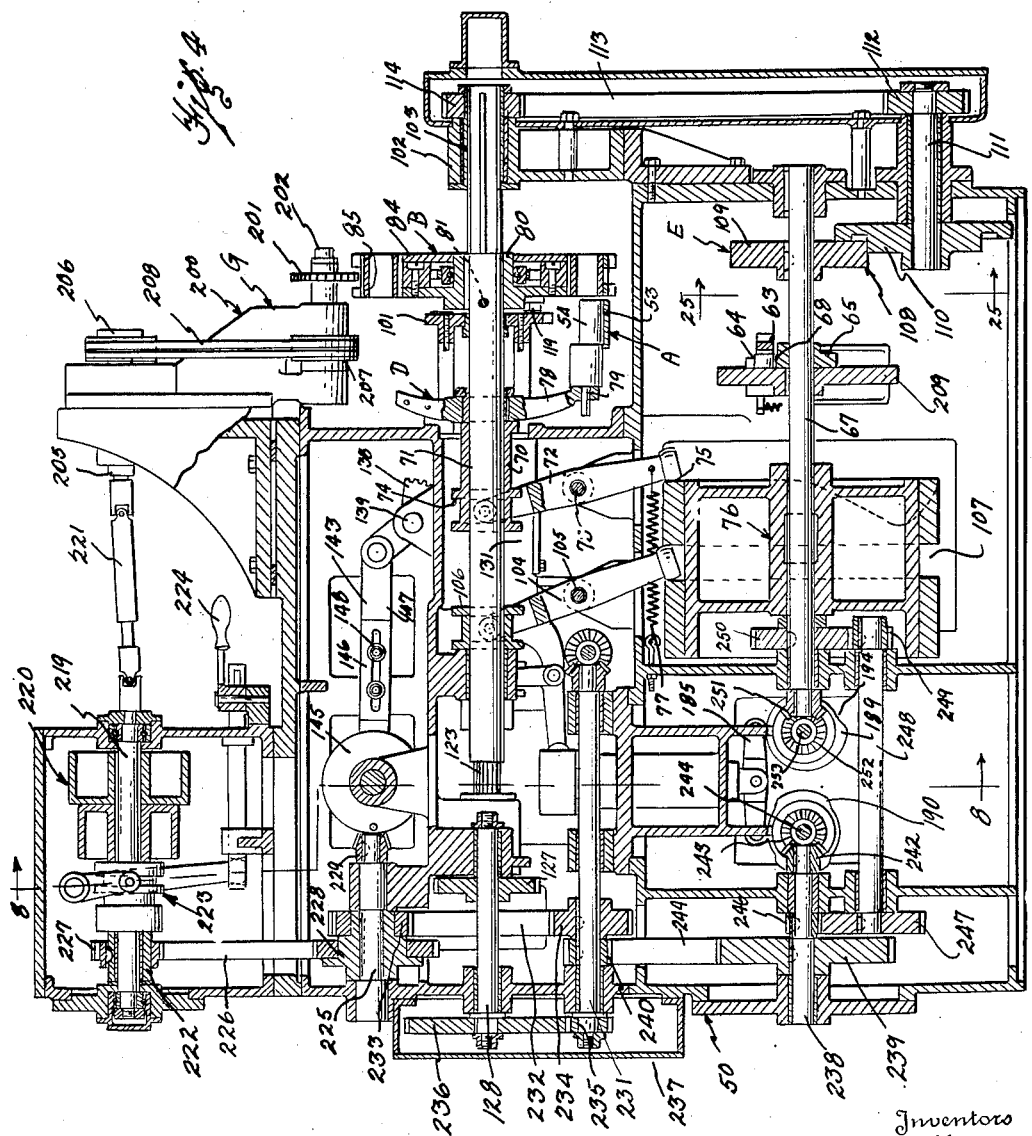

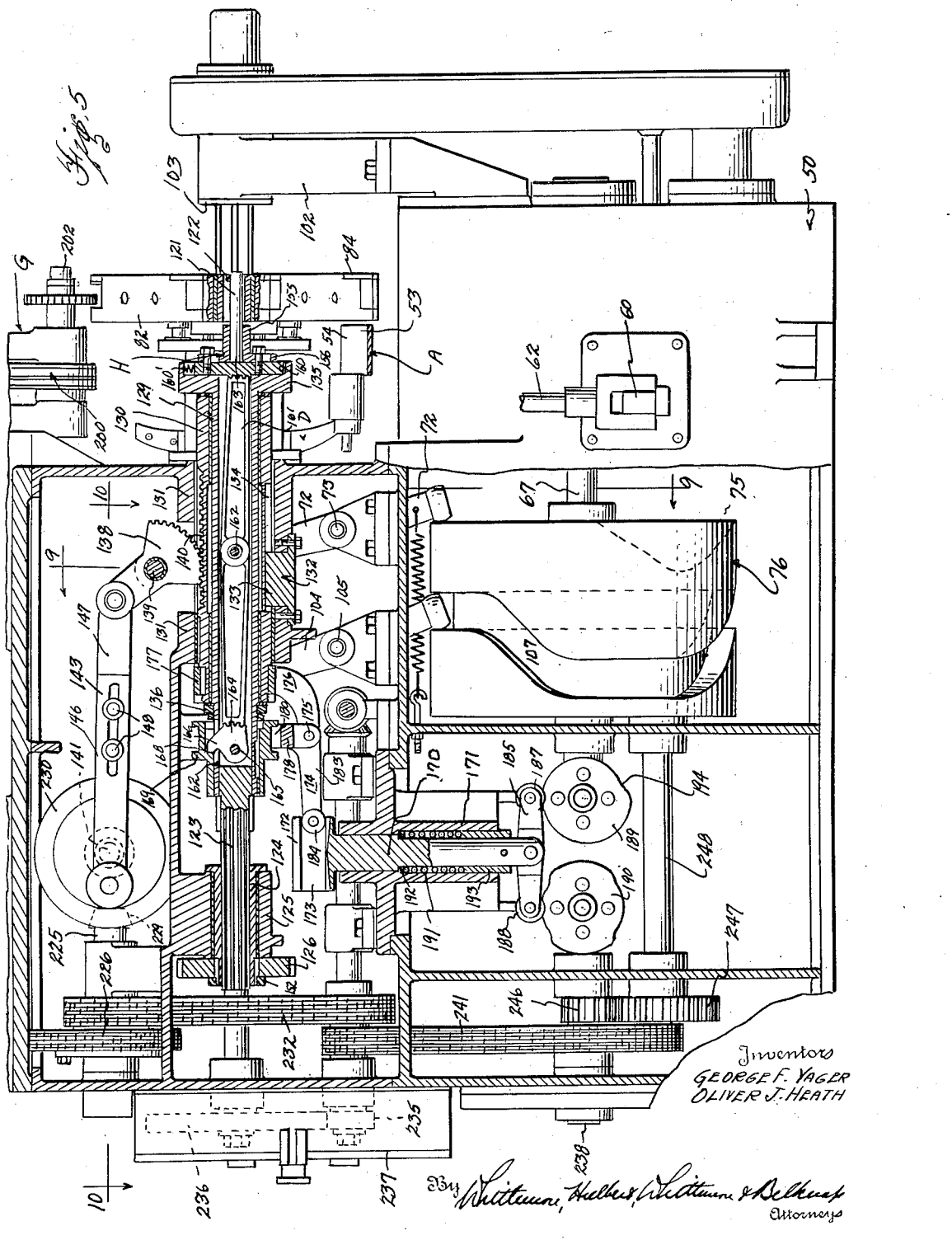

Nov. 10, 1936.  G. F. YAGER ET AL  2,060,158
METALWORKING MACHINE
Filed Oct. 24, 1932   19 Sheets-Sheet 6
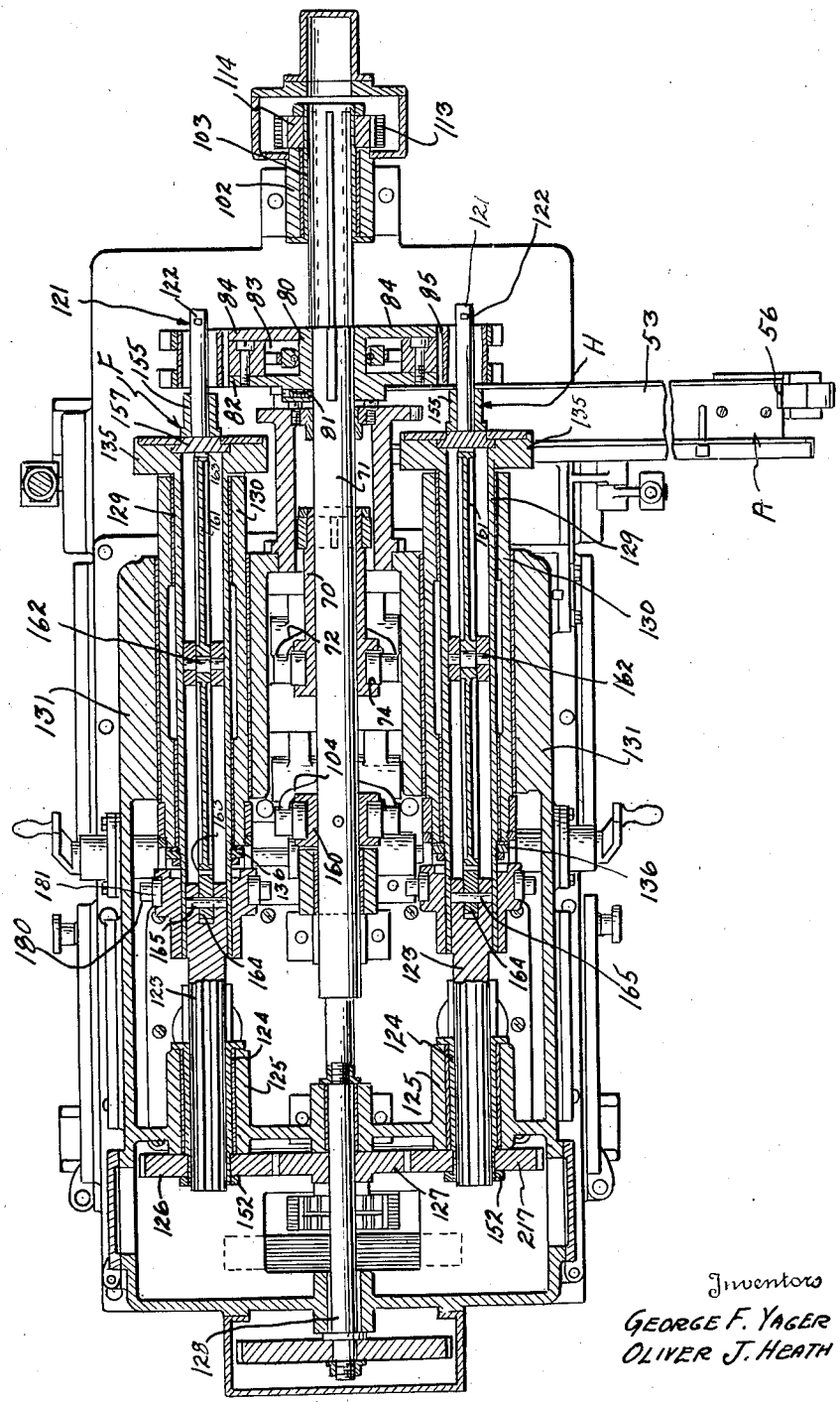

Nov. 10, 1936.   G. F. YAGER ET AL   2,060,158
METALWORKING MACHINE
Filed Oct. 24, 1932   19 Sheets—Sheet 7
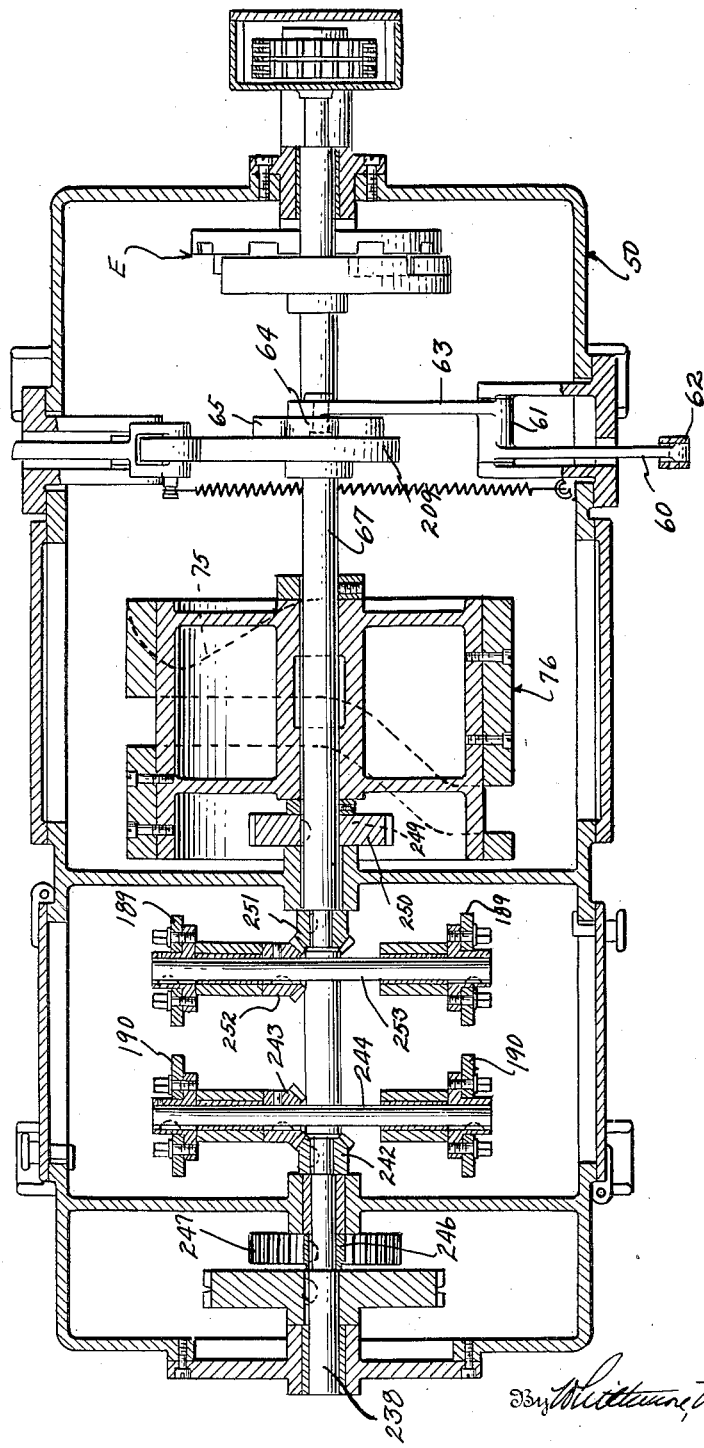
Inventors
GEORGE F. YAGER
OLIVER J. HEATH

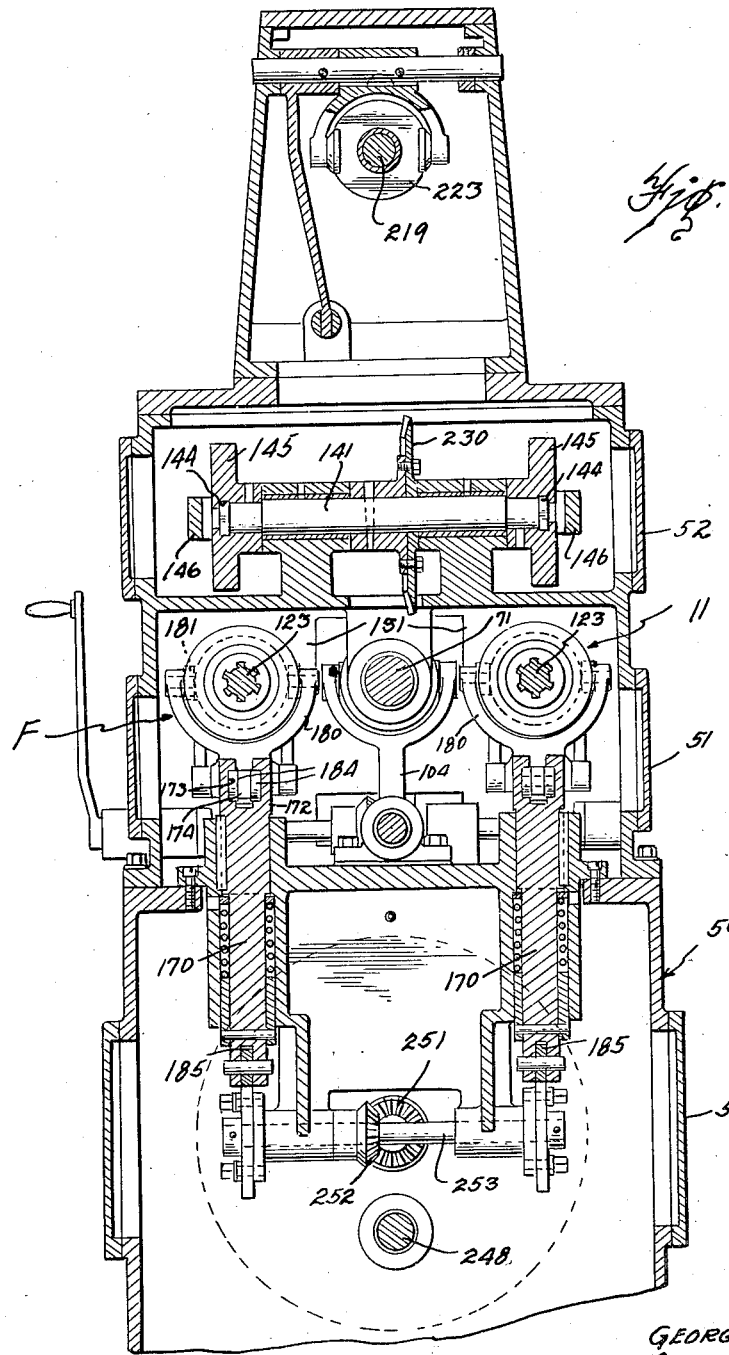

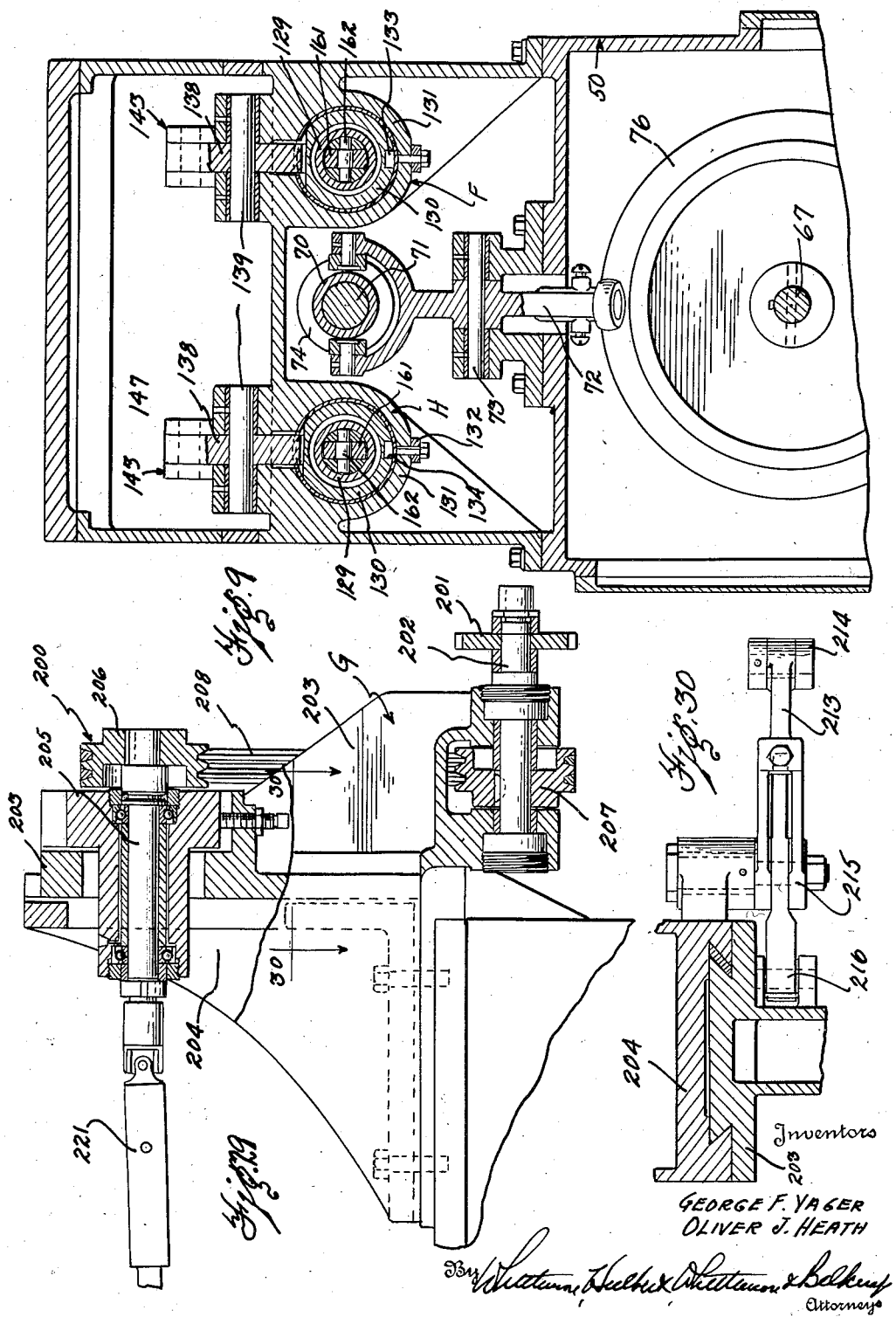

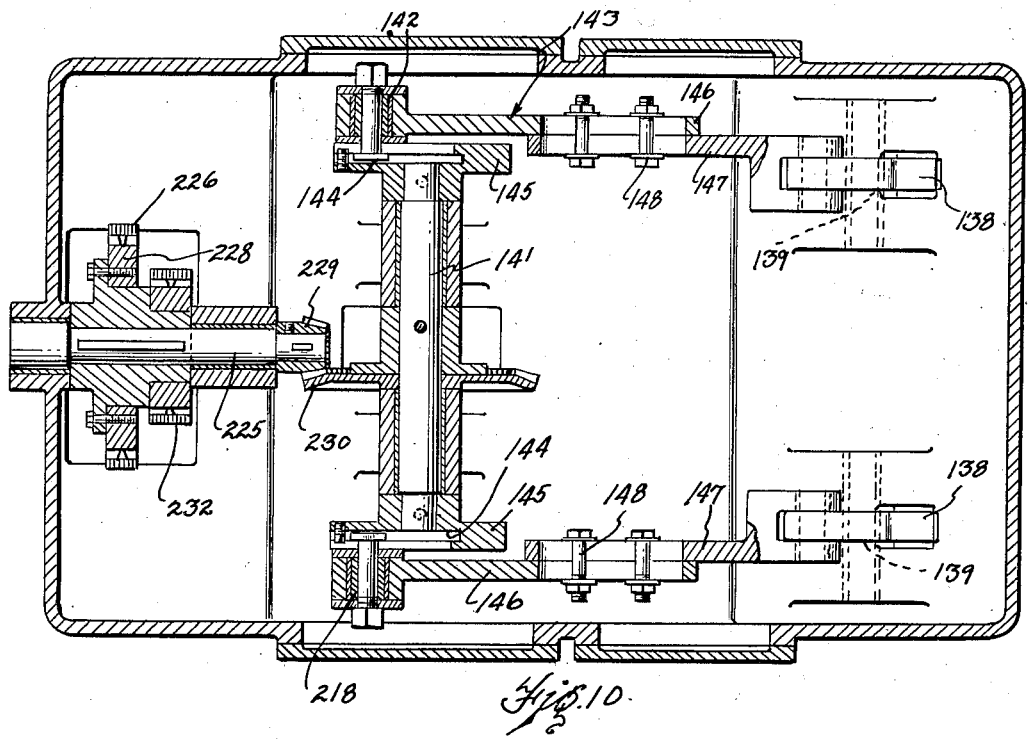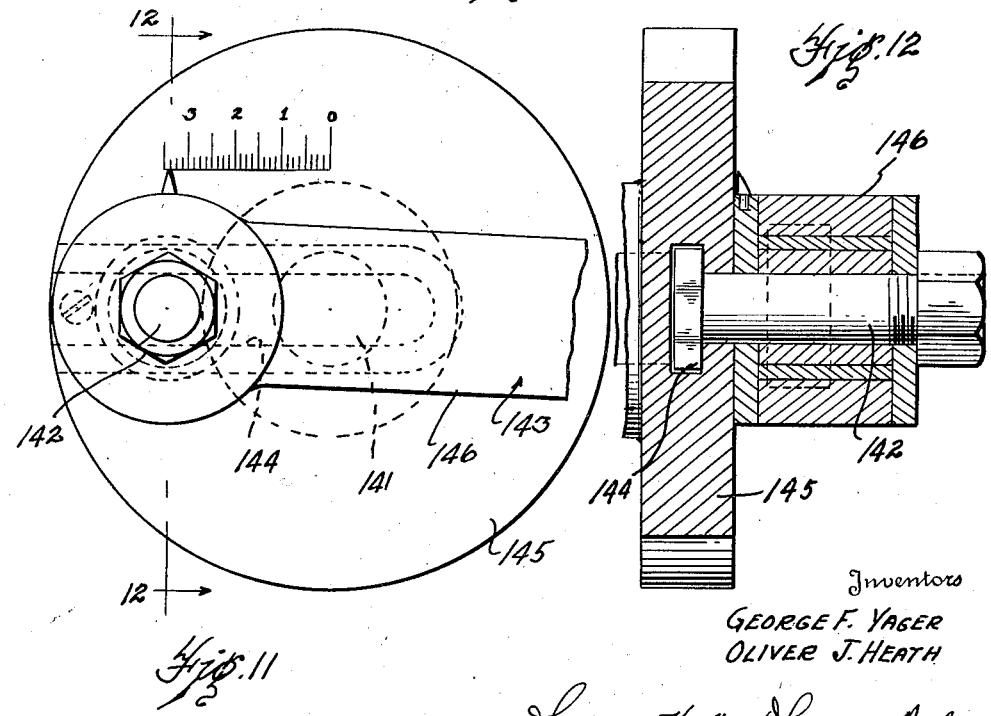

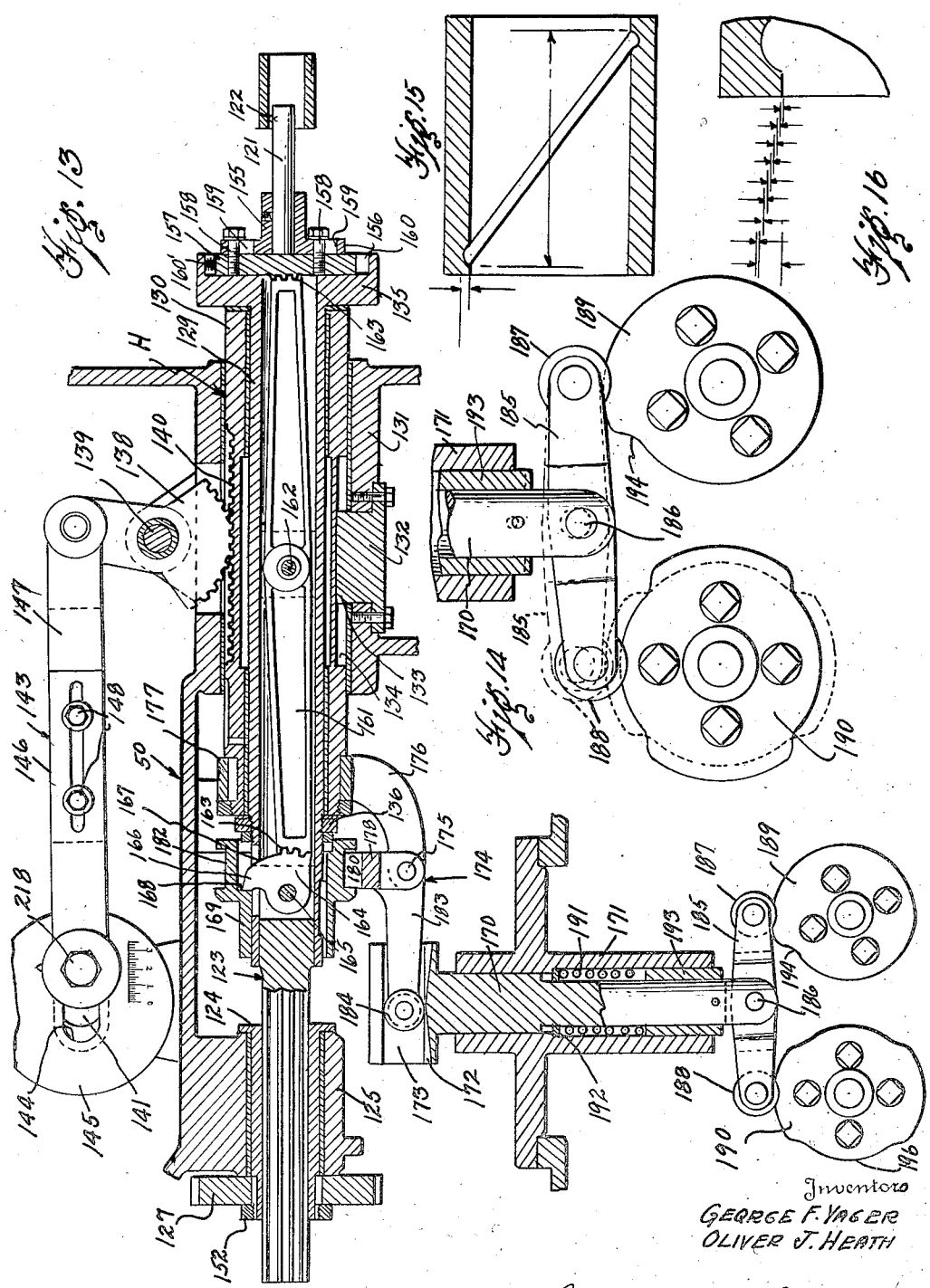

Nov. 10, 1936.  G. F. YAGER ET AL  2,060,158
METALWORKING MACHINE
Filed Oct. 24, 1932   19 Sheets-Sheet 12

Inventors
GEORGE F. YAGER
OLIVER J. HEATH
Attorneys

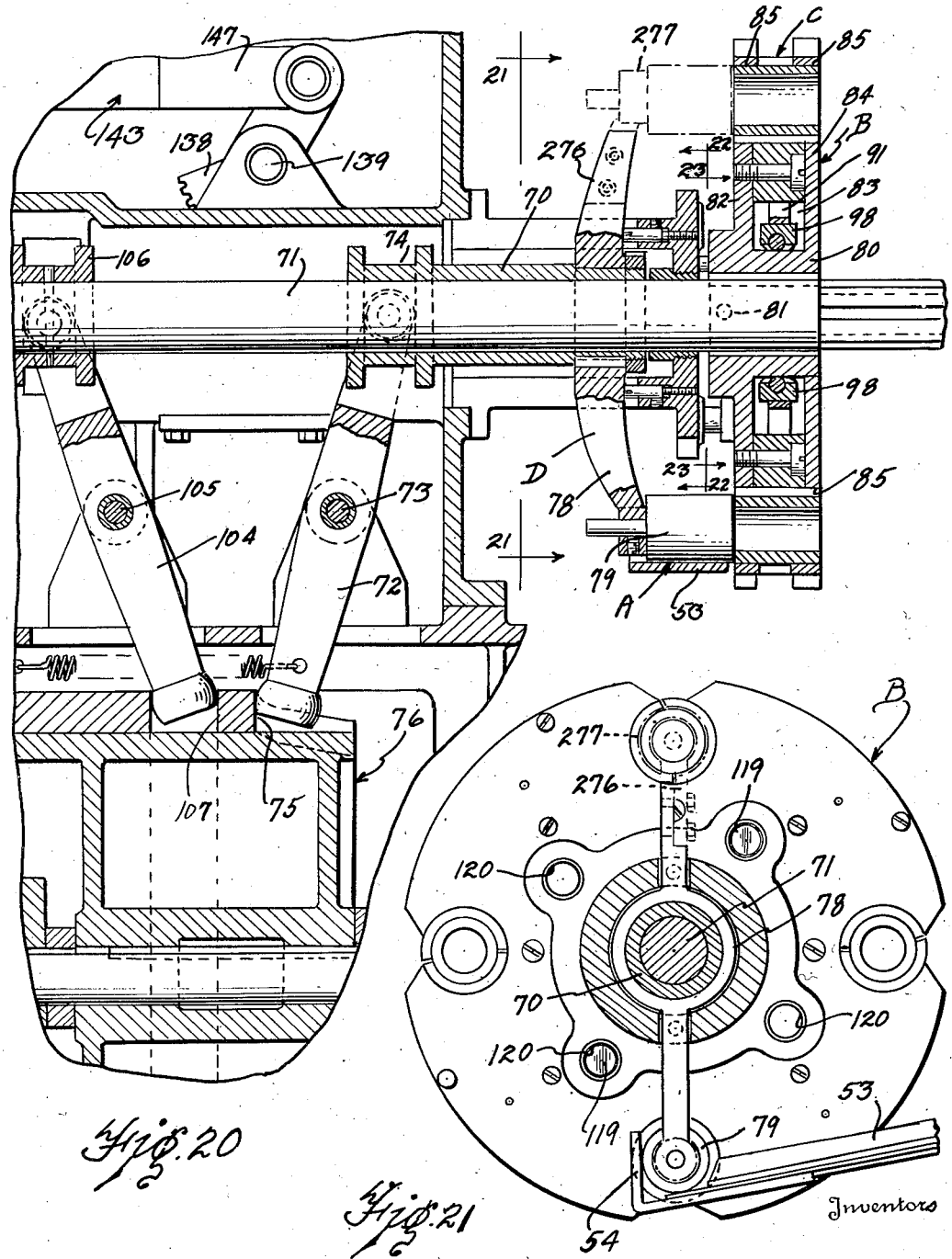

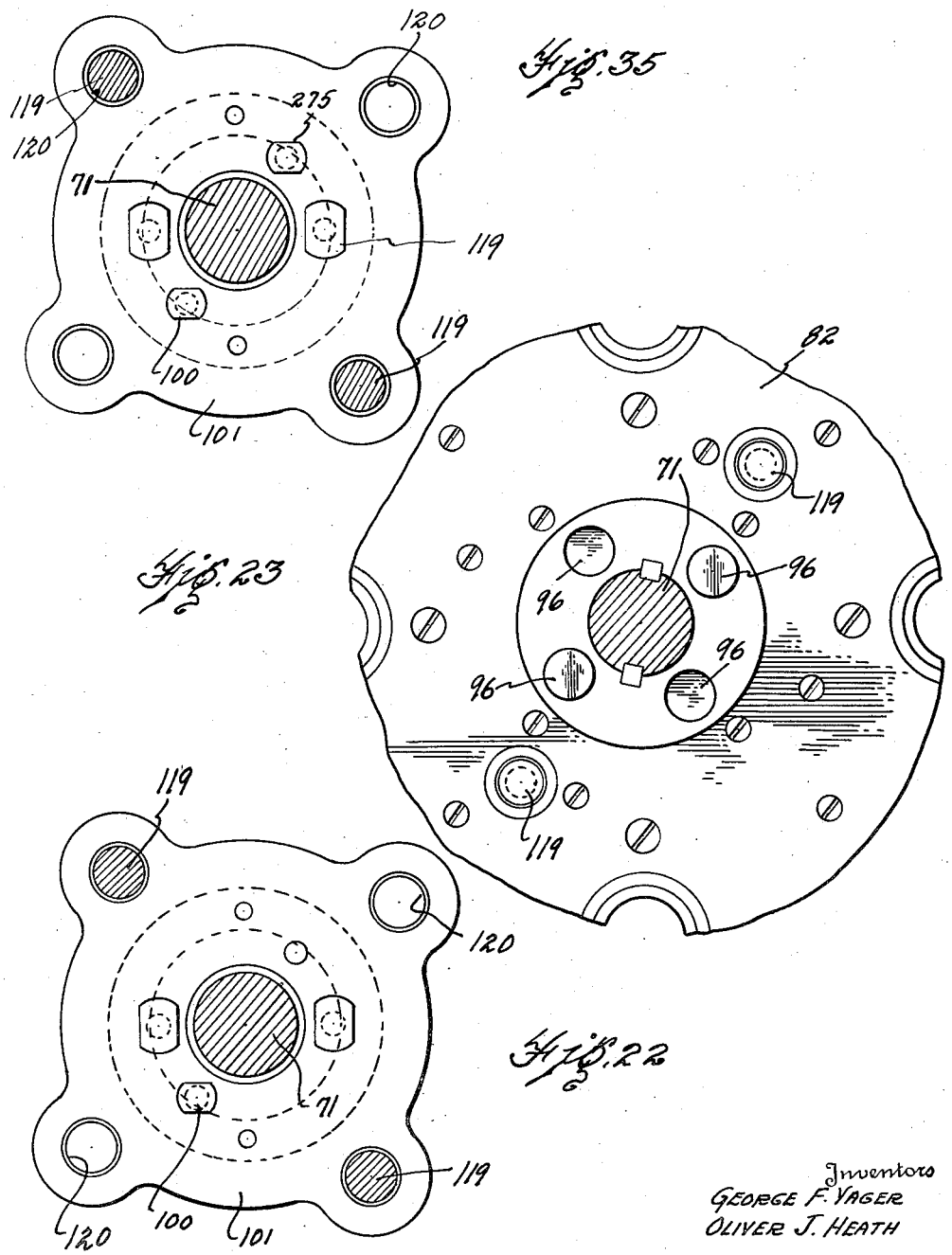

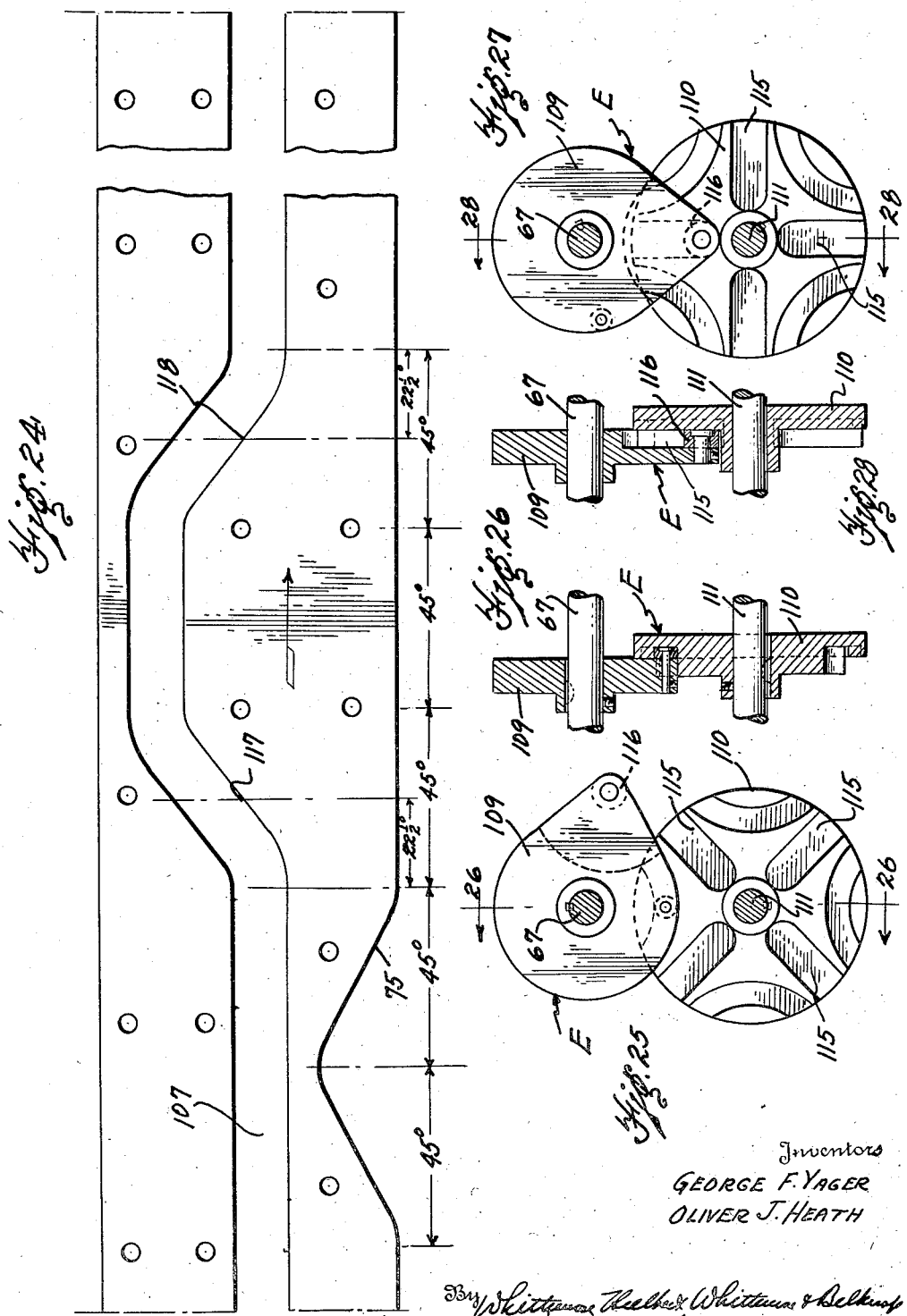

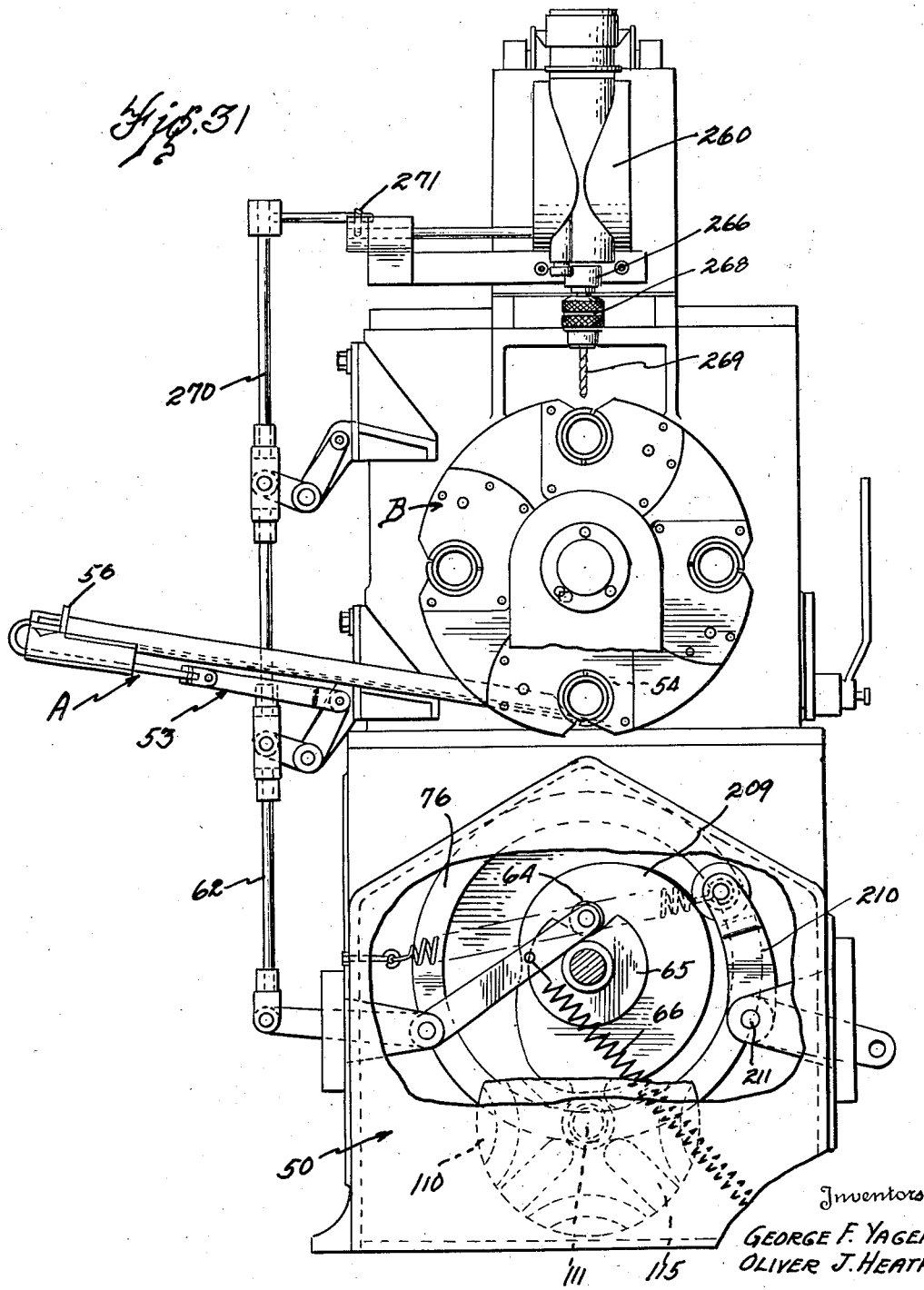

Nov. 10, 1936.    G. F. YAGER ET AL    2,060,158
METALWORKING MACHINE
Filed Oct. 24, 1932    19 Sheets-Sheet 17
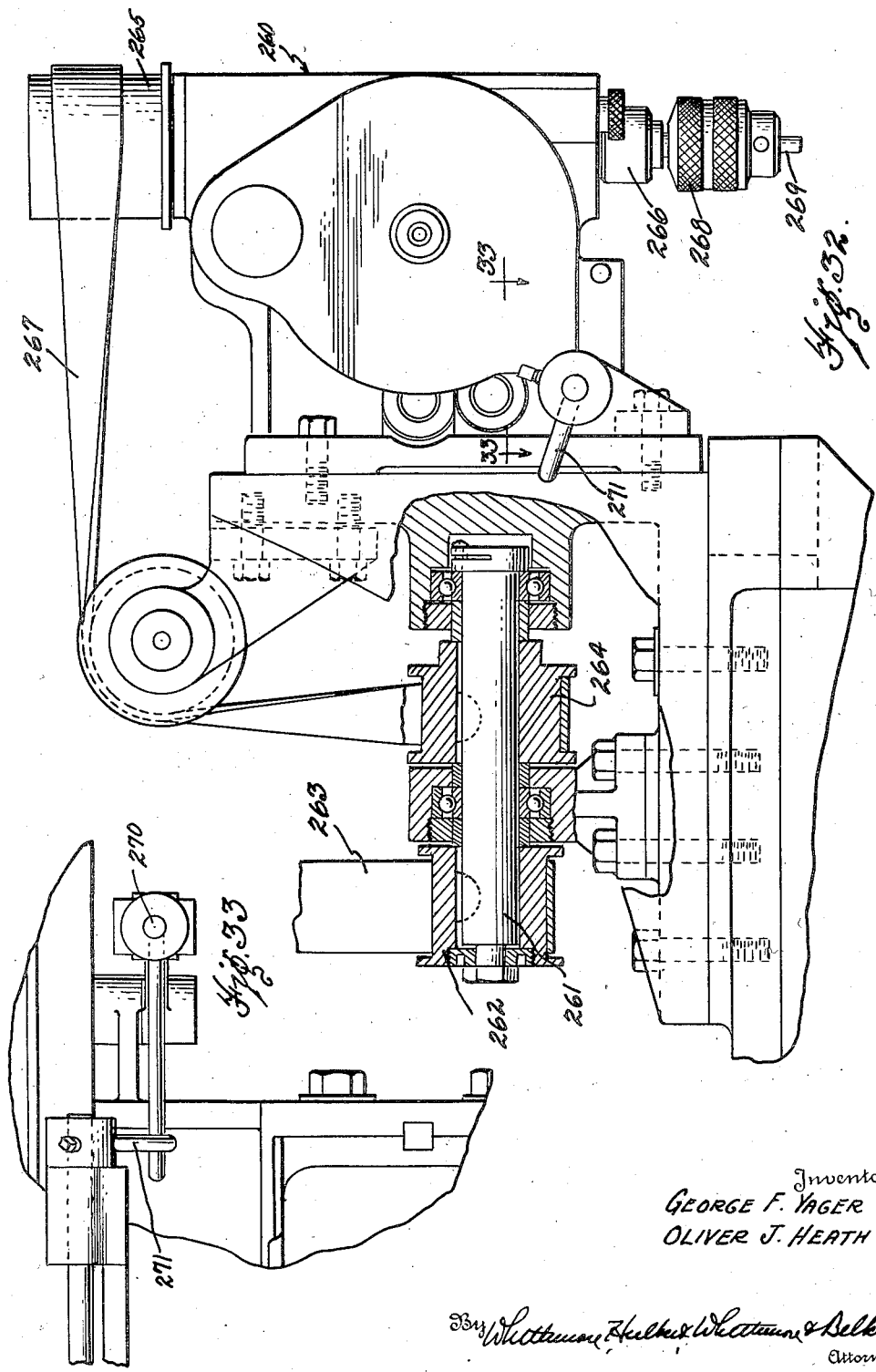
Inventors.
GEORGE F. YAGER
OLIVER J. HEATH

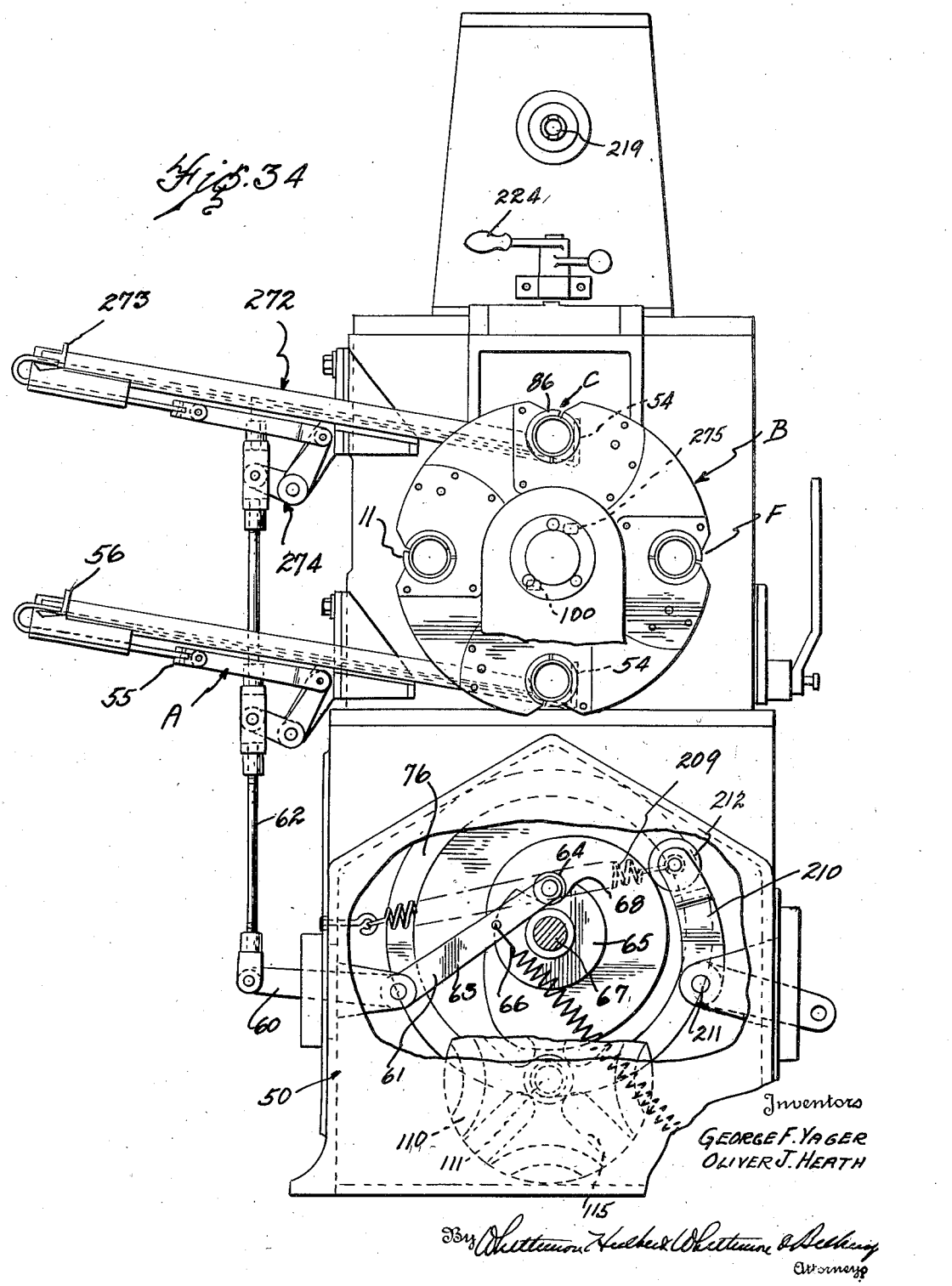

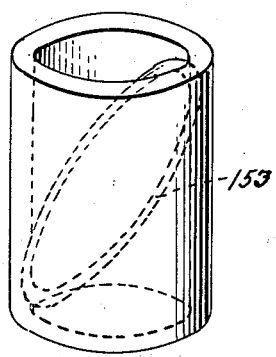
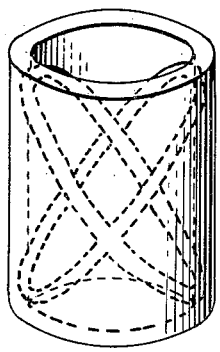
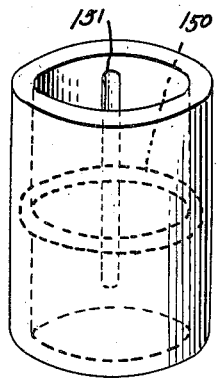
Fig. 38  Fig. 39  Fig. 40
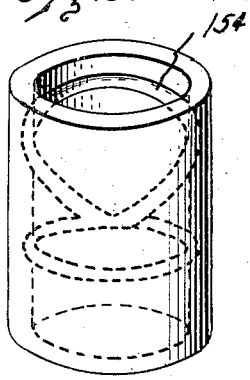
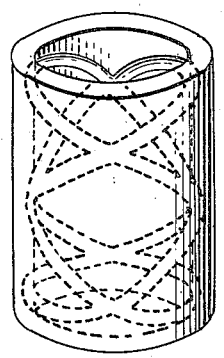
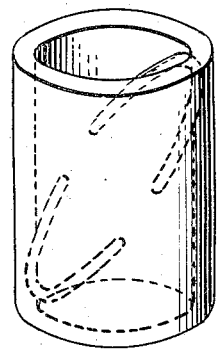
Fig. 41  Fig. 42  Fig. 43
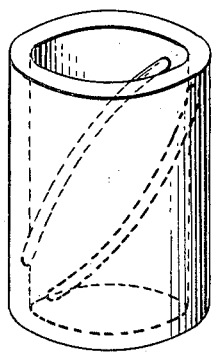
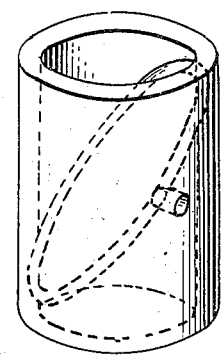
Fig. 44  Fig. 37  Fig. 36
Inventors
GEORGE F. YAGER
OLIVER J. HEATH Patented Nov. 10, 1936

2,060,158

UNITED STATES PATENT OFFICE 2,060,158

METAL WORKING MACHINE

George F. Yager and Oliver J. Heath, Toledo, Ohio, assignors to The Bunting Brass and Bronze Company, Toledo, Ohio, a corporation of Ohio Application October 24, 1932, Serial No. 639,354

94 Claims. (Cl. 29—38)

This invention relates generally to metal working machines and refers more particularly to machines for forming grooves in bushings or like members.

The invention contemplates simplifying the manufacture as well as appreciably reducing the cost of production of bushings or like members having grooves therein by providing a machine completely automatic in operation and capable of grooving bushings at a rate heretofore considered impossible.

One of the numerous objects of the present invention resides in the provision of a metal working machine having a grooving tool assembly movable throughout a predetermined path of travel for cutting a correspondingly shaped groove in the work and having means for altering the path of travel aforesaid to vary the configuration of groove. In accordance with this invention, the grooving tool assembly is mounted for both rotation and reciprocation, and means is provided whereby the speed of one of the aforesaid movements may be varied from zero to a predetermined maximum relative to the speed of the other movement in order to change the resultant path of travel of the tool.

Another object of this invention consists in providing means for gradually feeding the tool carried by the grooving assembly in a direction to increase the depth of cut thereof during movement of the same throughout the aforesaid path of travel and for subsequently withdrawing the tool from the work.

A further advantageous feature of the present invention resides in the provision of means for periodically discontinuing the cutting action of the groove forming tool and thereby rendering it possible to fashion a plurality of independent grooves in each bushing. When the above means is utilized in conjunction with the object set forth in the preceding paragraph, as is the case in the specific embodiment of this invention, the same functions independent of the feeding means and during the operation thereof to intermittently withdraw the tool.

Still another object of the present invention resides in the provision of means operable in timed relation to the withdrawing operation of the tool by the feeding means to move the work in a direction away from the tool and to index the work holder in order to introduce another article to said tool.

A further object of this invention is attributed to the provision of a metal working machine having a plurality of cutting tool assemblies of the type previously set forth and having a turret for successively positioning articles in operative relation thereto whereby the aforesaid assemblies cooperate to form compound grooves in the articles of practically any specified configuration. In the event a plurality of cutting tool assemblies are employed, the paths of travel of the tools carried thereby are independently adjustable so as to permit forming grooves of different configuration in each article.

A further advantageous feature of this invention resides in the provision of means for moving the turret axially away from and toward the work performing station or stations after a predetermined interval of operation thereof together with means for indexing the turret during the interval of movement of the same.

Still another object of this invention resides in the novel loading station provided for the turret as well as the means for automatically ejecting finished articles from the turret and for simultaneously transferring unfinished articles thereto.

A still further feature of the present invention consists in providing work holding clamps on the turret together with means for automatically releasing and actuating the clamp opposite the loading station during the interval of movement aforesaid of the turret.

The machine forming the subject matter of this invention possesses numerous other structural features which contribute materially to expediting production and reducing the cost of manufacture. These features, as well as the foregoing objects, will be made more apparent as this description proceeds, especially when considered in connection with the accompanying drawings, wherein:

Figure 2 is an end elevational view of the machine illustrated in Figure 1 with certain parts broken away for the sake of clearness;

Figure 3 is an elevational view of the opposite end of the machine shown in Figure 1;

Figure 4 is a sectional view taken on the line 4—4 of Figure 3;

Figure 5 is a sectional view taken substantially on the plane indicated by the line 5—5 of Figure 2;

Figure 6 is a horizontal sectional view taken on the line 6—6 of Figure 2;

Figure 7 is a horizontal sectional view taken on the line 7—7 of Figure 3;

Figure 8 is a sectional view taken substantially on the line 8—8 of Figure 4;

Figure 9 is a fragmentary sectional view taken substantially on the line 9—9 of Figure 5 and shown on sheet 15 of the drawings;

Figure 10 is a sectional view taken on the line 10—10 of Figure 5;

Figure 11 is a fragmentary side elevational view of a portion of the construction shown in Figure 10 illustrating the micrometer adjustment of the crank shaft throat;

Figure 12 is a sectional view taken on the line 12—12 of Figure 11;

Figure 13 is fragmentary enlarged longitudinal sectional view of the boring bar assembly illustrated in Figure 5 showing the same in a different position of adjustment;

Figure 14 is an enlarged detailed view illustrating the combined tool-feeding and kick-out mechanism;

Figure 15 is a longitudinal sectional view through a bushing illustrating one type of groove and the stroke of the tool necessary to produce the same;

Figure 16 is an enlarged fragmentary sectional view of a bushing illustrating the desired number of cuts to form the groove;

Figure 20 is a fragmentary enlarged longitudinal sectional view illustrating several of the parts shown in Figure 4 in a different position of adjustment;

Figure 1:
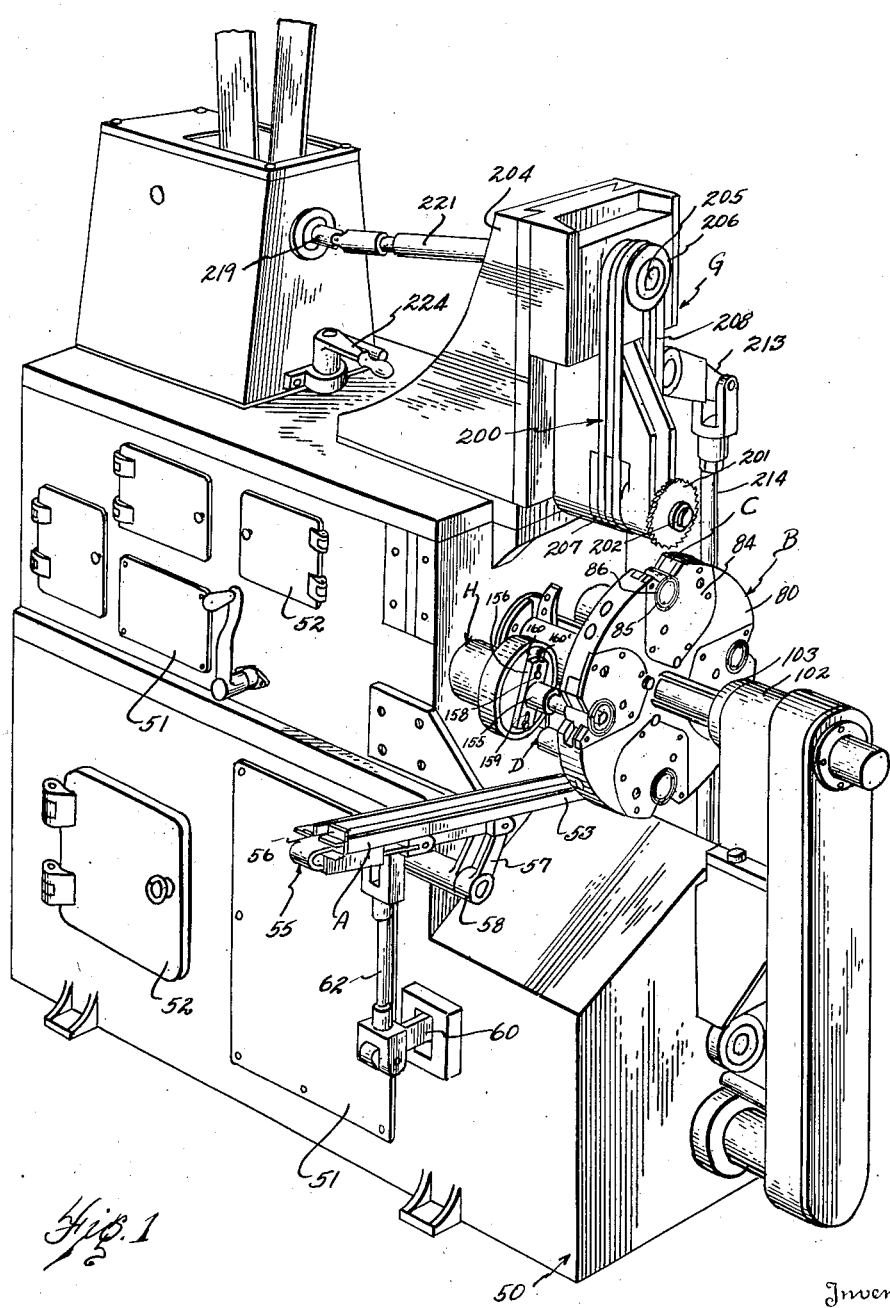
Figure 1 is a perspective view of a machine constructed in accordance with this invention.

Figures 21, 22 and 23 are sectional views taken respectively on the lines 21—21, 22—22 and 23—23 of Figure 20;

Figure 24 illustrates a development of the master cam;

Figure 25 is a sectional view taken on the line 25—25 of Figure 4 illustrating the indexing mechanism for the turret;

Figure 26 is a sectional view taken on the line 26—26 of Figure 25;

Figure 27 is a view similar to Figure 25 showing the indexing mechanism in another position;

Figure 28 is a sectional view taken on the line 28—28 of Figure 27;

Figure 29 is an elevational view illustrating the milling attachment for the machine and having certain parts broken away for the sake of clearness;

Figure 30 is a sectional view taken substantially on the line 30—30 of Figure 29;

Figure 31 is a view similar to Figure 2 showing a slightly modified form of machine;

Figure 32 is an enlarged elevational view partly in section illustrating the modification incorporated in Figure 31;

Figure 33 is a sectional view taken substantially on the line 33—33 of Figure 32;

Figure 34 is a view similar to Figure 32 showing another modified form of machine;

Figure 35 is a sectional view of a portion of the modification illustrated in Figure 34 and shown on Sheet 13 of the drawings;

Figures 36 to 44, inclusive, are views illustrating a number of grooves capable of being formed by the machines forming the subject matter of this invention.

Generally described, the bushings to be grooved are supplied to the machine by means of a suitable conveyor A having one end communicating with a suitable hopper (not shown) and having the other end positioned adjacent a work holding turret B carrying a plurality of circumferentially spaced clamps C. The turret B is mounted for reciprocation in an axial direction and when moved rearwardly to the position shown in Figure 4, the lowermost clamp C registers with the delivery end of the conveyor A for receiving a bushing therefrom. Upon movement of the turret to the aforesaid position, the clamp in registration with the delivery end of the conveyor is automatically released, and, as a consequence, provides for the immediate insertion of the bushing opposite the same on the conveyor.

The bushings are fed into the clamps upon the turret by means of a suitable transfer mechanism D mounted for reciprocation axially of the turret and operable in timed relation to the actuation of the latter so that each time the turret is moved to the position thereof shown in Figure 4, a bushing is trasferred from the conveyor by the transfer mechanism D into the clamp C in registration therewith. In this connection, it is to be noted that if the machine has been working a sufficient time to complete one cycle of its operation, a completed bushing will be in the clamp C of the turret when the same is moved into registration with the delivery end of the conveyor. In accordance with the present invention, however, this bushing is automatically ejected from the turret by the operation of the transfer mechanism D in transferring the preceding bushing from the conveyor into the adjacent clamp C on the turret. In other words, the transfer mechanism D performs the dual function of transferring a bushing from the conveyor into operative relation with the turret and simultaneously ejecting a completed bushing from the latter.

Assuming that the transfer mechanism D has completed its operation of depositing a bushing in the clamp C in registration with the conveyor, and that the remaining clamps on the turret are unloaded, it will be noted from the following description that continued operation of the machine effects a movement of the turret forwardly, or, in other words, in a direction away from the conveyor A. During the interval the turret is moving toward its outermost position, the clamp C containing the bushing is automatically actuated to grip the latter, and as the turret approaches its outer position, the same is indexed by suitable mechanism E to position the bushing opposite the first work performing station. In the present instance, the indexing mechanism E effects a rotation of the turret throughout approximately 90° since the work performing stations on the machine are spaced from each other in this relationship. As soon as the turret has been indexed in the manner specified above, the same is automatically moved rearwardly to the position thereof shown in Figure 4 wherein it is fixed against rotation and the transfer mechanism D again functions to load the clamp C in registration therewith. During the loading operation, the bushing previously indexed is being grooved by means of the boring bar assembly F shown in detail in Figures 5, 6 and 13. In other words, as soon as the turret is moved to the position thereof shown in Figure 4, the boring bar assembly F automatically functions to form the desired groove in the bushing. It will suffice to say at this point that the boring bar assembly F is capable of forming grooves of numerous different configurations in the bushing among which are the types shown in Figures 36, 41, 43 and 44. In general, when it is desired to cut the type of groove shown in Figure 36, the boring bar is reciprocated and simultaneously rotated. On the other hand, when it is desired to cut the type of grooves shown in either Figures 43 and 44, the same movement hereinbefore specified of the boring bar is effected with the exception that the tool is automatically retracted from the bushing at the points where it is desired to interrupt the groove. In the event the type of groove shown in Figure 41 is specified, the speed of rotation of the boring bar is materially increased. It will, of course, be apparent that numerous other types of grooves may be effected by either altering the relative speeds of reciprocation and rotation of the boring bar. In addition to the foregoing, further variations in the configuration of the groove may be effected by merely reciprocating the bar or by merely rotating the same. In the event the bar is prevented from rotating, a simple straight groove will be formed in the bushing, while if the bar is prevented from reciprocation, an annular groove will be formed in the bushing.

As soon as the boring bar assembly F has completed its function, the turret B is again moved forwardly and indexed whereupon it is returned to its normal position shown in Figure 4, and the operation of the bushing transfer mechanism as well as the boring bar assembly F is repeated. The bushing on the turret indexed from the boring bar assembly station assumes a position in operative relation to a suitable milling device G arranged to fashion a slot in the bushing in communication with the groove previously formed therein. The milling device G functions in timed relation to the remaining parts of the machine and performs its work during the interval of operation of both the boring bar assembly F and tool feeding mechanism D. In this connection, however, it is to be understood that if it is not desired to form a slot or other opening in the bushing, the operation of the milling device is discontinued, and the station permitted to remain idle or may be employed for some other purpose.

Upon completion of the operation of the milling device G and boring bar F on their respective bushings in the turret, the latter is again indexed by moving the same outwardly in the manner specified above. After the turret has been indexed, the same is moved to its normal position shown in Figure 4, and the bushing previously milled is introduced to a second boring bar assembly H. The second boring bar assembly H is identical to the assembly F in both its operation and construction. In other words, the assembly H forms a second groove in the bushing which may be similar or entirely different from the groove formed by the assembly F depending upon the desired configuration of groove. In any event, the boring bar assembly H cooperates with the assembly F to form either one of the compound grooves shown in Figures 39, 40 and 42. In the event the compound grooves shown in Figures 39 or 42 are desired, it will be apparent that the boring bar assembly H merely functions to duplicate the type of groove fashioned by the boring bar assembly F. On the other hand, if the type of groove shown in Figure 40 is desired, the tool carried by one of the boring bars is prevented from rotation so as to form the straight groove, while the tool carried by the other boring bar is prevented from reciprocation so as to form the annular groove. The boring bar assembly H performs its operation on the bushing at the same time the other stations are functioning and at the same time the transfer mechanism D is moving another bushing into the turret. It may be stated at this point that in the event it is not desired to form a compound groove in the bushing, the tool carried by the boring bar assembly H may be removed and this station rendered idle.

Upon completion of the operation of the several stations in the above position of the turret, the latter is again indexed completing one cycle of operation of the turret since the first bushing inserted into the same by the transfer mechanism D again assumes a position in registration therewith and is discharged from the turret by this mechanism during the interval the same inserts another bushing in the clamp. It will be apparent from the above description that if it is desired to form bushings with only a single groove therein, the production of the machine may be doubled by substituting a loading station identical to the one hereinbefore described for the milling device G as shown in Figure 34 of the drawings. In the event this latter modification is employed, the milling operation may be either performed separately or may be accomplished by instituting another station in the present assembly. In other words, the principle hereinbefore set forth may be accomplished by various different combinations, and, accordingly, the present invention should not be restricted to the specific embodiment illustrated herein.

Referring more in detail to the machine illustrated in Figure 1 of the drawings, it will be noted that the same comprises a housing 50 formed of a plurality of sections suitably bolted together and having openings therethrough opposite the several vital parts of the mechanism so as to permit ready access to these parts. The aforesaid openings are normally closed by removable plates 51 and hingedly mounted doors 52. Carried by the housing 50 in any suitable manner is the loading mechanism A for supplying bushings to the turret B. The loading mechanism comprises a chute or conveyor 53 having the inner end positioned adjacent the rear side of the turret and having the outer end communicating with a suitable hopper (not shown) for receiving bushings therefrom. The chute 53 is substantially channel-shaped in cross section and the width thereof approximates the length of the bushings to be formed so as to permit depositing the bushings thereon with the axes thereof extending transversely of the chute. In the present instance, the chute is inclined in a direction to permit feeding the bushings to the turret B by gravity, and in order to accurately position the bushings opposite the clamps C on the turret upon completion of each indexing operation of the latter, the inner end of the chute is provided with an upwardly extending adjustable stop 54.

Although the chute 53 is shown herein as inclined to provide for obtaining a gravity feed of the bushings, this is not necessary since we have also shown herein mechanism 55 for effecting a positive feed of the bushings against the stop 54. As shown in Figure 2, the mechanism 55 comprises a reciprocable plunger 56 having the outer end positioned in alignment with the adjacent end of the chute 53 and having the inner end operatively connected to one arm 57 of a bell crank lever 58. The bell crank lever 58 is suitably pivotally mounted upon the housing 50, and the other arm 59 thereof is operatively connected to an arm 60 of a second bell crank lever 61 through the medium of an adjustable link 62. The other arm 63 of the bell crank 61 is provided with a roller 64 on the free end thereof urged into engagement with the periphery of a cam 65 through the medium of a spring 66. The cam 65 is secured to a cam shaft 67 journaled within the housing in any suitable manner, and the development of the cam 65 is accurately predetermined so as to effect an operative stroke of the plunger 56 as soon as the clamps C on the turret assume positions opposite the loading station. In detail, the periphery of the cam 65 is provided with a recess 68 therein of sufficient dimension to receive the roller 64 on the bell crank 61, with the result that when the cam is moved to a position wherein the recess 68 therein is opposite the roller, the latter is urged into the recess by the spring 66. This action obviously causes a rotative movement of the bell crank lever 61 in a clockwise direction, and through the connection between the lever 61 and bell crank lever 58 effects a corresponding movement of the latter to urge the plunger 56 inwardly relative to the chute 53. Inasmuch as the connection 62 between both of the aforesaid bell cranks is adjustable, it will be apparent that the stroke of the plunger 56 may be located to suit different conditions.

The bushing transfer mechanism D as shown particularly in Figures 4 and 20 comprises a sleeve 70 mounted for reciprocation upon the turret indexing shaft 71. The rear end of the sleeve 70 is formed with an annular groove 74 therein, while the forward end is provided with a downwardly extending yoke 78 having a plunger 79 fixed to the lower end thereof opposite the delivery end of the chute 53 for engaging the first bushing thereon. Reciprocation of the sleeve 70 is effected by a master cam 76 having a cam face 75 for engaging the lower end of a toggle 72 mounted intermediate the ends for oscillation about a fixed axis 73 and having the upper end bifurcated with the furcations arranged in the groove 74 at opposite sides thereof. The master cam 76 is keyed to the cam shaft 67, and the development of the cam face 75 thereon is such as to effect a forward movement of the plunger 79 when the turret is in the position thereof shown in Figure 4. Forward movement of the plunger 79 transfers the bushing previously positioned by the cam 65 into the adjacent clamp C on the turret B. Upon completion of this operation, the cam face 75 provides for the return of the sleeve 70 so as to permit another bushing to be moved against the stop 54 by the cam 65 and associated parts thereof.

The turret B employed in the present instance comprises a hub section 80 fixed as at 81 to the shaft 71 and having a radially outwardly extending annular portion 82 formed with a plurality of circumferentially spaced recesses 83 in the front face thereof for receiving the clamps C. The recesses 83 in the turret correspond in number to the number of clamps, and the latter in turn correspond in number to the number of stations with which the work is introduced during one complete cycle of operation of the turret. In the illustrative embodiment of the invention, one complete cycle of operation of the turret introduces the work to four distinct stations, and, accordingly, there are four recesses 83 in the front face of the turret with a clamp C in each recess. The clamps C in the recesses 83 are normally concealed by means of plates 84 removably secured to the turret. Both the portions 82 of the turret and the plates 84 are provided with aligned openings 85 therethrough opposite the bushing receiving portions of the clamps C in order to provide for inserting the bushings in and ejecting the same from the clamps C.

Figure 17:
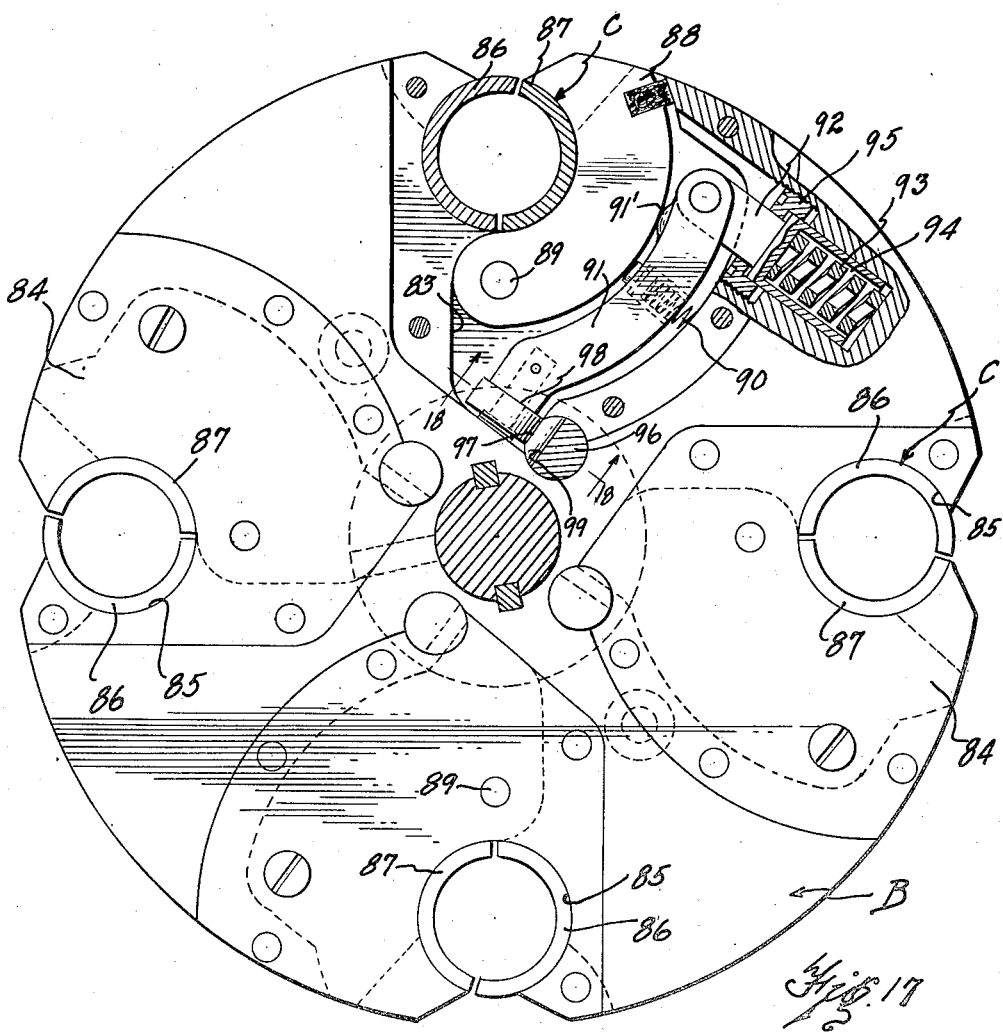
Figure 17 is an elevational view of one end of the turret showing certain parts removed and other parts in section for the sake of clearness.
Figure 18:
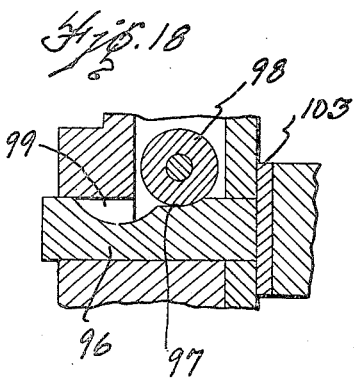
Figure 18 is a sectional view taken on the line 18—18 of Figure 17.
Figure 19:
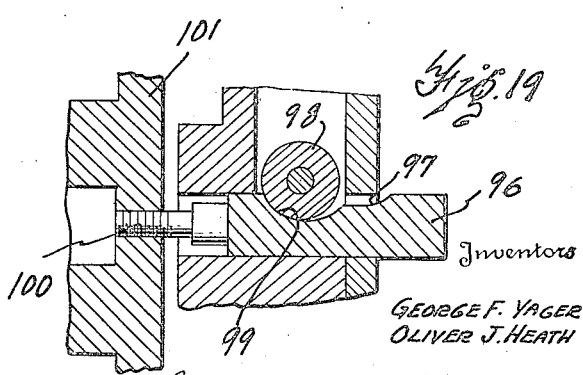
Figure 19 is a view similar to Figure 18 showing the parts thereof in a different position of adjustment.

Referring now more in detail to the particular construction of the clamps and with special reference to Figure 17, it will be noted that each of the same is provided with a stationary section 86 and a relatively movable section 87 cooperating in their innermost positions to grip a bushing therebetween. The relatively movable section 87 of each clamp is carried by an arm 88 pivotally connected as at 89 on the vertical center line of the clamp and normally urged in a direction to engage the section 87 of the clamp with the section 86 thereof by means of a relatively weak spring 90. The arm 88 of each clamp is forcibly moved to effect the clamping action by means of an actuating lever 91 pivotally connected at the outer end thereof to a plunger 92 which in turn is urged in a direction to engage a cam portion 91' on the lever 91 with the swinging end portion of the arm 88 by means of a spring 93. The springs 93 are considerably heavier than the springs hereinbefore described and are housed within counterbored portions 94 formed in the end walls of the recesses 83. The degree of axial movement of the plungers 92 by the springs 93 and accordingly the force exerted by the clamp upon the bushing is determined by adjustable stops 95 threadedly mounted within the counterbored portions for engagement with the plungers 92. The cam portions 91' for engaging the arms 88 are formed on the actuating levers 91 at points spaced inwardly from the pivotal connections of the levers with the plungers 92 so that oscillation of the actuating levers about the aforesaid pivotal connections will serve to engage the cam portions 91' with the arms 88 or disengage the same therefrom depending upon the direction of oscillation of the actuating levers. With the above construction, it will be apparent that outward movement of the inner ends of the levers 91 causes the cam portions 91' on the levers to engage the arms 88 and move the section 87 of the clamp carried thereby toward the section 86. Upon continued outward movement of the inner ends of the levers 91, the latter fulcrum about the points of engagement of the cam portions 91' with the arms 88, and in so doing, causes the outer ends of the levers 91 to move inwardly against the action of the spring 93, resulting in a yieldable clamping action. Oscillation of each of the actuating levers 91 about its pivotal connections with the plunger 92 is effected herein by means of a pin 96 mounted within the turret for reciprocation axially of the latter. Each of the pins 96 is provided with a cam surface 97 for engaging a roller 98 mounted upon the inner end of each of the levers 91, and in addition is formed with a recess 99 in advance of the cam surface 97 to provide for the necessary movement of the levers 91 to release the clamps C. The above arrangement is such that axial movement of the pins 96 from the position shown in Figure 19 to the position illustrated in Figure 18 causes an outward movement of the inner ends of the actuating levers 91 to effect the clamping action in the manner specified above. On the other hand, it will be apparent that axial movement of the pins 96 in the opposite direction will permit the rollers 98 to drop into the recesses 99 and thereby release the action of the clamps C.

From the foregoing, it will be seen that the action of the clamps C depends entirely upon the operation of the pins 96, and in the present instance, the latter are actuated in dependence upon reciprocation of the turret B. As stated in the general description of the machine, the turret B is movable forwardly from the position thereof shown in Figure 4 whereupon it is indexed or rotated 90° and returned to the aforesaid position. In the present instance, movement of the turret rearwardly from its forwardmost position automatically releases the clamp C opposite the loading station by effecting a forward displacement of the pin 96 for controlling this clamp, and forward movement of the turret from the position thereof shown in Figure 4 causes a rearward displacement of the aforesaid pin 96 to effect the clamping action. In order to release the clamp opposite the loading station upon rearward movement of the turret, a pin 100 is mounted upon a relatively stationary part 101 of the machine in such a manner as to extend forwardly from the latter part in alignment with the pin 96 for controlling the above mentioned clamp. The pin 100 is adjustably fixed to the part 101 so as to permit accurately determining the extent the same displaces the clamp controlling pins 96 as the latter assume positions opposite the same. Rearward displacement of the aforesaid pin 96 to obtain the clamping action is effected by engagement of the forward end of the pin with the part 103 of the machine when the turret is moved forwardly. Thus, from the foregoing, it will be apparent that movement of the turret to its innermost position shown in Figure 4 automatically releases the clamping action on the bushing opposite the loading station so as to permit this bushing to be ejected from the turret by the movement of the unfinished bushing into operative relation with the clamp. It will also be apparent from the above description that outward movement of the turret to index the unfinished bushing to the first work performing station automatically actuates the clamp to fixedly secure the bushing in the turret.

Axial displacement of the turret B is effected herein by reciprocating the shaft 71 to which the turret is secured through the medium of the pin 81. As shown particularly in Figures 4 and 6, the forward end of the shaft is splined within a sleeve 103 which in turn is journaled in the fixed part 102 of the machine rendering it possible for the shaft 71 to be reciprocated as well as rotated. For reciprocating the shaft 71 and accordingly the turret B, we provide an arm 104 similar to the toggle arm 72 hereinbefore described. In detail, the arm 104 is pivotally connected as at 105 intermediate the ends thereof to a fixed part of the machine, and the upper end of the same is bifurcated with the ends of the furcations engaging within an annular collar 106 fixed to the shaft 71. The lower end of the arm 104 is fashioned for engagement within a cam groove 107 formed in the master cam 76 and developed to effect a reciprocation of the turret B in timed relation to the operation of the transfer mechanism D. As will be observed from Figure 24, the cam surface of the groove 107 is so determined with respect to the cam face 75 that the turret B is moved outwardly from the position thereof shown in Figure 4 as soon as the transfer mechanism D has completed its operation.

Inasmuch as the work carried by the turret B is introduced to four different work performing stations during one complete revolution of the turret, the latter is rotated one-quarter revolution during the interval the same is moved forwardly and rearwardly by the shaft 71. The foregoing rotation of the turret is effected in the present instance by suitable indexing mechanism E comprising a Geneva gear 109 adapted to mesh with a Geneva wheel 110. The Geneva wheel 110 is secured to a suitable stub shaft 111 journaled in the housing 50 and having a gear 112 secured to the outer end thereof operatively connected to a gear fixed to the sleeve 103 through the medium of a chain 113. Inasmuch as the sleeve 103 has a splined connection with the shaft 71, it will be apparent that rotation of the former will effect a corresponding rotation of the latter and turret B. Referring more in detail to the particular construction of indexing mechanism and with special reference to Figures 25 and 28, inclusive, it will be noted that the Geneva wheel is provided with four grooves 115 arranged at right angles to each other and fashioned to receive a roller 116 carried by the Geneva gear 109. The arrangement is obviously such that during one complete revolution of the Geneva gear, the Geneva wheel is rotated one-quarter turn, and since the latter is connected to the shaft 71 by a one to one ratio, a corresponding rotation of the turret necessarily results. The operation of the Geneva gearing is such that the same begins to function to rotate the turret B when the cam follower on the rock arm 104 assumes the position designated generally by the reference character 118 in Figure 24 of the drawings and does not complete the rotation of the turret until the cam follower assumes the position designated by the reference character 117 in the same figure. In other words, during the initial and final reciprocatory movement of the turret B, the Geneva gearing is inoperative in so far as rotating the shaft 71 is concerned. This arrangement provides for extending the turret positioning pins 119 carried by the hub of the turret through suitable openings 120 formed in the fixed part 101.

Referring now more in detail to the several work performing stations provided in the machine illustrated herein and with special reference to the first station to which the bushings are introduced after being assembled with the turret, it will be noted that this station serves to form one groove in the inner surface of the bushing. This station is designated generally herein by the reference character F and as shown in Figures 5 and 13 comprises a boring bar 121 adapted to extend into the bushings as the latter assume positions opposite the same and having a tool 122 for forming the desired groove in the bushing. As will be presently described, the boring bar 121 is operated in timed relation to the actuation of the turret B so that as soon as the latter is returned from its forwardmost position to the position thereof shown in Figure 4, the boring bar 121 begins its function of grooving the bushing. The boring bar 121, in addition to being capable of simultaneous rotation and reciprocation, is also capable of radial movement so as to project the tool 122 into and out of operative relationship with the bushing. In detail, the boring bar is carried by a shaft 123 having the rear end portion splined within a bushing 124 which in turn is journaled in a fixed part 125 of the housing 50. By referring to Figure 6, it will be observed that the rear end portion of the bushing 124 projects rearwardly beyond the part 125 and has secured thereto a gear 126 arranged to mesh with a driving gear 127 fixed to a suitable countershaft 128. The above arrangement is such as to provide for rotation of the shaft 123 and at the same time to permit reciprocation of the same. As illustrated in Figures 5 and 13, the forward end 129 of the shaft 123 is substantially tubular in cross section and is journaled in a bushing 130 which in turn is slidably, but non-rotatably mounted in a bearing 131 formed on the housing 50. The bushing 130 is prevented from rotation by means of a key 132 secured to the bearing 131 and having a portion 133 projecting into a slot 134 extending longitudinally of the bushing 130. The forward end of the latter engages the rear side of an enlarged head 135 on the tubular portion 129 of the shaft 123, and the rear end thereof engages a suitable jam nut 136 threaded upon the tubular portion 129. It will be apparent from the foregoing arrangement that reciprocation of the bushing 130 will effect a corresponding reciprocation of the shaft 123 and boring bar 121 irrespective of whether the latter are rotated or not. Reciprocatory movement is imparted to the bushing 130 by means of a segmental pinion 138 mounted for oscillation about an axis 139 extending transversely of the bushing 130 and having the teeth thereof fashioned to mesh with corresponding rack teeth 140 spaced longitudinally along the aforesaid bushing. The pinion 138 is oscillated about its axis 139 by means of a crank shaft 141 having a crank pin 142 at one end thereof operatively connected to the pinion through the medium of a connecting rod 143. The crank pin 142 has a slotted connection 144 with the cheek 145 of the crank shaft so as to permit the throw of the crank pin to be varied from zero to a predetermined maximum. Moreover, the connecting rod 143 is formed of two parts 146 and 147 having the adjacent ends thereof adjustably secured together as at 148 so as to provide for accurately locating the reciprocatory stroke of the tool 122 relative to the work or bushing to be grooved.

The foregoing construction is such as to provide for obtaining first, mere reciprocation of the boring bar, second, rotation only of the bar and, third, simultaneous reciprocation and rotation. In other words, if it is desired to cut merely an annular groove in the bushing of the type indicated by the reference character 150 in Figure 40, the crank pin 142 is moved to a position in alignment with the axis of the crank shaft 141 so as to render the same inoperative to reciprocate the boring bar. On the other hand, if it is desired to cut a groove in the bushing of the type illustrated by the reference character 151 in Figure 40, the gear 126 may be readily removed by merely disengaging the nut 152 so as to restrict the boring bar to a reciprocatory movement. In the event it is desired to cut a groove in the bushing of the type illustrated by the reference character 153 in Figure 38, the boring bar is simultaneously rotated and reciprocated. In this connection, it will be apparent that various other configurations of grooves of the type illustrated generally by the reference character 154 in Figure 41 may be formed in the bushing by varying the speed of rotation of the boring bar during the interval of reciprocation of the same. The speed of rotation of the boring bar may be varied by changing the ratio of certain of the gears in the driving mechanism to be more fully hereinafter described.

In the previous description, reference has been made to the fact that the boring bar is capable of a radial movement so as to provide for moving the tool 122 into and out of operative relationship with the bushing. The foregoing is accomplished by securing the rear end of the boring bar 121 in a tool holder 155 having a radially extending flange 156 secured to the front side of a plate 157 by means of the diametrically opposed bolts 158. The bolts project forwardly from the plate through radially extending slots 159 in the flange 156 of the bushing so as to permit initially adjusting the boring bar, and the plate 157 is mounted for radial sliding movement in a recess 160 formed in the front face of the enlarged head 135 on the shaft 123. The above construction is such as to permit movement of the tool 122 into cutting relationship with the work by moving the plate 157 radially outwardly against the action of the spring 160' which normally tends to urge the tool away from the work.

The foregoing movement of the plate is effected automatically by means of a rocker 161 located within the tubular section 129 of the shaft 123 for movement as a unit therewith and pivotally mounted intermediate the ends as at 162 for rocking movement in a vertical plane. The opposite ends of the rocker 161 are provided with teeth 163 fashioned to respectively mesh with corresponding teeth on the plate 157 and on a segmental pinion 164. Preferably this segmental pinion 164 is also located within the tubular section 129 of the shaft 123 and is mounted for rocking movement in a common plane with the rocker arm about a pin 165 extending transversely of the axis of the shaft 123. The arrangement is such that rocking movement of the pinion 164 about the pin 165 effects a corresponding rocking movement of the arm 161, and through the medium of the latter, imparts a sliding movement to the plate 157. In order to rock the segmental pinion 164 about the pin 165, the former is provided with a cam portion 166 extending outwardly through an elongated slot 167 formed in the tubular section of the shaft 123. The cam portion 166 on the segmental pinion is adapted to be engaged by an internal shoulder 168 formed on a sleeve 169 which in turn is slidably, but non-rotatably mounted upon the shaft 123. With this construction, it will be seen that movement of the sleeve 169 axially of the shaft 123 in a forward direction effects a rocking movement of the segmental pinion 164 about the pin 165 in a direction to cause the plate 157 to move radially outwardly against the spring 160 through the action of the rocker 161. The aforesaid sliding movement of the sleeve 169 is accomplished by an automatically reciprocable plunger 170 mounted for vertical sliding movement in a cylinder 171 fixed to the housing 50 and provided at the upper end thereof with an enlarged head portion 172 having a recess 173 therethrough extending in the direction of reciprocation of the boring bar. The enlarged head portion 172 is operatively connected to the sleeve 169 by means of a bell crank lever 174 pivotally secured as at 175 to a suitable bracket 176 having an annular portion 177 fixed to the non-rotatable bushing 129. In detail, the upwardly extending arm 178 of the bell crank lever is bifurcated as at 180, and the ends of the furcations are provided with rollers 181 for engaging within an annular recess 182 formed on the forward end of the sleeve 169. The other arm 183 of the bell crank lever 174 extends rearwardly from the arm aforesaid into the recess 173 in the head of the plunger 170 and is provided with rollers 184 for anti-frictionally engaging the walls of the recess.

As will be observed from Figure 13, the above construction is such that upward movement of the plunger 170 causes a forward rocking movement of the bell crank lever 174, and, as a consequence, effects a sliding movement of the sleeve 169 in a corresponding direction to move the plate 157 outwardly in the manner specified above. It will further be apparent that the aforesaid connection between the plunger 170 and the sleeve 169 is such as to permit unobstructed rotation and reciprocation of the shaft 123.

Reciprocatory movement is imparted to the plunger by means of a rock arm 185 pivotally connected intermediate the ends thereof to the lower end of the plunger as at 186 and having rollers 187 and 188 at the extremities thereof respectively engaging the peripheries of the cams 189 and 190. The rollers are normally urged into engagement with the cams aforesaid by means of a spring 191 encircling the plunger 170 within the cylinder 171 and having the opposite ends respectively engaging a shoulder 192 on the cylinder and the upper end of a collar 193 fixed to the plunger. The surface of the cam 189 with which the roller 187 engages is accurately developed to gradually move the grooving tool 122 outwardly as the same is moved across the surface of the work providing the elevation of the roller 188 is not varied from the position thereof shown in Figure 13. Assuming that the elevation of the roller 188 shown in the above figure is maintained throughout one complete revolution of the cam 189, it will be noted that as the low point 194 of the latter is moved opposite the roller 187 on the rock arm, the latter fulcrums about the roller 188 under the action of the spring 191 to engage the roller 187 with the aforesaid low point of the cam 189 causing a downward movement of the plunger 170 and a corresponding inward movement of the tool 122 through the operative connections between the plunger and tool previously set forth. The throw of the cam 189 gradually increases from the low point of the same to the high point thereof with the result that rotation of the cam, from a position wherein the roller 187 engages the low point 194 to a position wherein the latter roller engages the high point, effects a relatively slow upward movement of the arm 185 about the point of engagement of the roller 188 with the cam 190, and in so doing imparts a corresponding outward movement to the tool 122. Thus, it will be seen that the depth of the groove to be cut in the work by the tool 122 may be formed to within predetermined limits by selecting the proper cam 189.

The cam 189 preferably rotates at a relatively slow rate of speed as compared to the speed of rotation of the boring bar and the velocity of reciprocation of the latter. In other words, the boring bar rotates and/or reciprocates a number of times during one complete revolution of the cam 189, with the result that the grooves are formed gradually in the bushings. However, irrespective of any variations in the speed of travel of the boring bar, the cam 189 rotates at the same speed as the cam shaft 67 and the relationship between the cam 189, master cam 76 and indexing mechanism E is such that the former cam operates to withdraw the tool 122 from the work prior to the operation of the master cam and indexing mechanism to perform their respective functions.

It has been previously stated that the roller 188 forms a fulcrum for the rock arm 185 during feeding of the cutter 122 into the work, and, accordingly, periodic lowering of the roller 188 at predetermined points throughout the tool feeding interval of the cam 189 will effect a movement of the tool out of engagement with the work and thereby provide for forming an interrupted groove in the latter. The above may be accomplished by designing the dwell of the cam 190 in such a manner as to provide for withdrawing the cutter 122 from the work at the desired points throughout the path of travel of the same. In the specific embodiment of the invention shown in Figure 13, the cam 190 is formed with two low points 196 arranged diametrically opposite each other so that when the roller 188 is moved into engagement with either of these portions, the plunger 170 is automatically moved downwardly and the tool is withdrawn from the work irrespective of the position of the roller 187 on the feeding cam 189. The cam 190 is rotated at a considerably higher speed than the cam 189, and in the present instance, the cam 190 rotates one complete revolution each time the boring bar is reciprocated and each time the latter is rotated one complete revolution. Thus, it will be observed that in the specific embodiment of the invention, the cutter 122 is withdrawn from the work twice each time the tool is reciprocated once for each time the same completes one revolution. This arrangement provides for forming two separate grooves in the bushings of the types shown generally in Figures 43 and 44. It will be understood that by varying the particular shape of the cam 190, the points of occurrence of the interruptions in the groove may be changed and the number of interruptions varied. It will also be understood that in the event it is not desired to form interruptions in the groove, the cam 190 is interchanged for an annular wheel which will have no effect whatsoever on the reciprocation of the plunger 170.

Having described in detail the first station to which the bushings carried by the turret are introduced after leaving the loading means, reference will now be made to the second station to which the bushing previously grooved by the boring bar 121 is introduced. For the purpose of illustration, we have shown the second station as comprising a milling attachment 200 having a rotary cutter 201 fashioned to form a slot through one wall of the bushing in communication with the groove previously formed therein by the bar 121. As illustrated in Figure 29, the cutter 201 is mounted upon a driven shaft 202 suitably journaled within a bracket 203 which in turn is mounted for vertical sliding movement on a fixed part 204 of the attachment. Journaled in the part 204 is a drive shaft 205 having a pulley 206 secured to the forward end thereof and operatively connected to a pulley 207 on the driven shaft 202 through the medium of a belt 208. The tool 201 is continuously rotated during the operation of the machine and is moved relative to the work by means of the reciprocable slide or bracket 203. The slide 203 is automatically moved downwardly to engage the cutter 201 with the work in timed relation to the actuation of the turret B, and this is accomplished herein by a cam 209 (Figure 2) fixed to the cam shaft 67 for operation thereby. The connection between the cam and reciprocable slide comprises a bell crank lever 210 pivotally mounted as at 211 on the housing 50 and having a roller 212 on one arm thereof for engaging the cam 209. The other arm of the bell crank lever extends through a slot in the housing and is operatively connected to the outer end of a rock arm 213 by means of a link 214. The rock arm 213 is pivotally mounted upon the fixed part 204 as at 215, and the free end thereof is pivotally secured as at 216 to the bracket 203. The cam 209 is so designed that as soon as the turret assumes its innermost position shown in Figure 4, the same functions through the linkage hereinbefore described to move the cutter downwardly into engagement with the bushing. Upon completion of the cutting operation of the tool 201, the cam serves to raise the slide 203 and thereby permit the turret to be moved outwardly preparatory to indexing the slotted bushing to the next work performing station.

The next or third work performing station comprises the boring bar assembly H. In the present instance, the boring bar assembly H is identical in construction to the assembly F hereinbefore described in that it also serves to form a groove in the bushing. The boring bar assembly H is rotated from the driving mechanism of the machine by a gear 217 similar to the gear 126 and fixed to the rear end of the boring bar assembly 127. The gear 217 is identical to the gear 126 so that both assemblies will be rotated at identical speeds. Reciprocatory movement is effected by the crank shaft 141 having a crank pin 218 secured to the end thereof opposite the crank pin 142 and connected to the boring bar assembly H by mechanism identical in construction to the mechanism hereinbefore set forth for connecting the crank pin 142 to the boring bar assembly F. As will be observed from Figure 6, the tool carried by the boring bar assembly H is fed into and out of engagement with the work in the same manner as the tool 122. In other words, the boring bar assembly H is merely a duplication of the boring bar assembly F for accomplishing the same results as the latter.

The boring bar assembly H cooperates with the boring bar assembly F to form compound grooves in the bushing of the type shown generally in Figures 39, 40 and 42. In the event the type of compound groove shown in Figure 40 is desired, reciprocation of one of the boring bar assemblies is rendered inoperative by moving the crank pin therefor in axial alignment with the crank shaft 141 resulting in pure rotational movement of the tool associated therewith and causing an annular groove to be cut in the bushing thereby. The other boring bar assembly is prevented from rotation by removing the driving gear therefrom, with the result that the same will be restricted to reciprocation only to form a straight groove in the bushing. As previously stated, the position of the two grooves relative to the bushings may be accurately determined by adjusting the length of the connections between the crank pins and boring bar assemblies. When it is desired to form the type of groove shown in Figure 39 in the bushing, both boring bar assemblies are rotated and reciprocated as a unit. The formation of the two grooves illustrated in Figure 39 at right angles to each other is insured since a rotation of the turret throughout 180° is required to bring a bushing from the station F to the station H. It will be obvious from the foregoing that numerous different types of grooves may be formed in the bushing by independently varying the operation of the two boring bar assemblies or by rendering one or the other of the assemblies inoperative.

Referring now more in detail to the means for actuating the several mechanisms or stations aforesaid of the machine in timed relation, it will be noted that there is illustrated in Figure 4 a driving shaft 219 having change speed pulleys 220 secured thereto and adapted to be selectively connected to a source of power (not shown). The forward end of the drive shaft is operatively connected to the shaft 205 for continuously rotating the milling cutter 201 through the medium of a propeller shaft 221 having the opposite ends universally connected respectively to the shafts 205 and 219. Journaled upon the drive shaft 219 in rear of the pulleys 220 is a driven sleeve 222 adapted to be operatively connected to the drive shaft 219 through the medium of a suitable clutch designated generally herein by the reference character 223, and the latter is actuated from a position exteriorly of the machine by a suitable control lever 224. The above arrangement is such that movement of the control lever 224 to one position of adjustment establishes a driving engagement between the sleeve and drive shaft 219, while movement of the control in another position of adjustment releases the sleeve 222 from connection with the driving shaft 219.

The sleeve 222 is operatively connected to a driven shaft 225 through the medium of a chain 226 reeved around the sprockets 227 and 228 secured respectively to the sleeve 222 and shaft 225. The latter is journaled in any suitable manner within the housing and has secured to the forward end thereof a beveled pinion 229 adapted to mesh with a ring gear 230 fixed to the crank shaft 141 intermediate the ends thereof for rotating the latter to reciprocate the boring bar assemblies. The driven shaft 225 is operatively connected to a second driven shaft 231 through the medium of a chain 232 reeved around sprockets 233 and 234 secured respectively to the driven shafts 225 and 231. The driven shaft 231 is also journaled within the housing 50, and the rear end thereof projects outwardly beyond the adjacent wall of the housing for driving connection with the corresponding end of the countershaft 128. The latter shaft is rotated at a considerably reduced speed from the driven shaft 231 by means of a relatively small gear 235 fixed to the rear end of the shaft 231 and adapted to mesh with a comparatively larger gear 236 fixed to the countershaft. Both of the aforesaid gears are arranged exteriorly of the housing and are normally concealed by means of a closure 237 capable of being readily removed when desired to change the gear ratio between the countershaft 128 and driven shaft 231. Inasmuch as the countershaft 128 functions to rotate both of the boring bars, it will be apparent that a change in gear ratio as indicated above will effect a corresponding change in the speed of rotation of the boring bars.

The driven shaft 231 is operatively connected to the cam shaft 67 as well as to both sets of cams 189 and 190 for actuating the same and associated parts thereof. In detail, a stub shaft 238 is journaled in the housing and has secured thereto a sprocket 239 connected to a relatively smaller sprocket 240 fixed to the driven shaft through the medium of the chain 241. Mounted upon the forward end of the stub shaft 238 for actuation thereby is a beveled pinion 242 arranged to mesh with a correspondingly beveled pinion 243 fixed to the transverse shaft 244 upon which the kick-out cams for both boring bar assemblies are mounted. The ratio of the driving connection between the driven shaft 231 and the kick-out cams 190 is such that the number of revolutions of the cams 190 correspond to the number of complete revolutions of the crank shaft 141, or, in other words, during each reciprocation of the boring bar assemblies, the kick-out cams 190 are rotated one complete revolution.

In the present instance, the tool feeding cams 189 are driven from the stub shaft 238 by securing a gear 246 upon the stub shaft having teeth fashioned to mesh with a relatively larger gear 247 fixed to the rear end of a countershaft 248. The countershaft 248 is suitably journaled in the housing, and the forward end of the same has secured thereto a relatively small gear 249 adapted to mesh with a comparatively larger gear 250 secured to the cam shaft 67. The latter shaft in turn has fixed thereto a beveled gear 251 arranged to mesh with a correspondingly beveled gear 252 fixed to a transverse shaft 253 upon which both cams 189 are secured. The ratio of the gearing between the stub shaft 238 and shaft 253 is such as to rotate the cams 189 at a speed considerably less than the speed of rotation of the cams 190 and the same as the speed of the cam shaft 67 for the reasons fully discussed in the preceding description.

It will be observed from the foregoing that varying the speed of rotation of the boring bars by changing the gears 235 and 236 does not affect the speeds of rotation of either the stub shaft 238 or the cam shaft 67. The ratio of the drive for the cam shaft as well as both sets of cams 189 and 190 remains fixed, with the result that the timed relations of the operations performed by these units are not affected by changes in the speeds of rotation of the boring bar assemblies.

*Operation*

The machine shown herein for the purpose of illustration comprises four stations spaced 90° from each other around the axis of the turret B. In detail, the boring bar assemblies are spaced 180° from each other and the axes thereof are arranged in a common horizontal plane. The milling machine attachment 200 and the loading station A are spaced 90° from the boring bar assemblies and are arranged at 180° from each other. Inasmuch as the machine is provided with four stations in the manner specified above, there are four independent clamps associated with the turret B and spaced from each other distances corresponding to the spacing of the aforesaid stations around the axis of the turret so as to provide for positioning a bushing opposite each loading station.

Assuming that the turret is in the position thereof shown in Figure 4 wherein a bushing is opposite each of the stations, it will be noted that the latter are simultaneously actuated to perform their respective functions upon the bushings in registration therewith. For example, upon initial movement of the turret B to the aforesaid position, the cam surface 75 on the master cam 76 operates to move the transfer mechanism D axially toward the turret B to transfer a bushing from the station A within the previously loosened clamp opposite this station and to incidentally eject the finished bushing from this clamp. At the same time the transfer mechanism D is performing the above functions, the boring bar assemblies are moving throughout a predetermined path of travel within the bushings in registration therewith, and the cams 189 are functioning to gradually feed the tools radially outwardly into operative relation with the surfaces of the bushings to be grooved. During both the transfer and grooving operations previously set forth, the cam 209 operates the milling machine attachment 200 to form a slot in the bushing adjacent thereto. Also during the operation of the above stations, the cam surface 75 on the master cam 76 operates to withdraw the transfer mechanism D from its operative position with respect to the turret.

As soon as the cams 189 have completed their feeding strokes, the tools associated with the boring bar assemblies are withdrawn from engagement with the bushings in registration therewith, and the cam groove 107 on the master cam operates to reciprocate the turret B from the position thereof shown in Figure 4. As the turret B is moved forwardly or away from the stations, the clamp opposite the loading station A is automatically actuated to grip the bushing therein and during the reciprocation of the turret, the same is indexed by the mechanism E to advance each bushing into registration with the next adjacent station. During the interval the turret B is returned to the position thereof shown in Figure 4 by the cam groove 107, the clamp for the finished bushing opposite the loading station A is automatically released so as to permit the latter bushing to be ejected by the insertion of another bushing into the clamp through the medium of the transfer mechanism D. As soon as the turret B is moved to its extreme rearward-most position, the tools associated with the boring bar assemblies are fed radially outwardly by the cams 189 and the station A as well as the milling attachment 200 are operated in the same manner hereinbefore described.

As previously stated, in the event it is desired to form continuous grooves in the bushings by both the boring bar assemblies, the cams 190 are interchanged for disks having a diameter so determined as to maintain the rear ends of the rock arms 185 for both boring bar assemblies at a constant elevation throughout the operation of the cams 189. However, if it is desired to form interrupted grooves in the bushings, cams 190 of the type illustrated herein may be employed so as to periodically reciprocate the rear ends of the rock arms 185 in a direction to withdraw the tools associated with the boring bar assemblies from and return the same into engagement with the work. Inasmuch as both boring bar assemblies are duplications of each other, it will be noted that the same may be independently adjusted to form different types of grooves in each bushing. For example, if it is desired to form an interrupted groove in one bushing and a continuous groove in the other, a cam 190 of the desired configuration may be associated with one rock arm 185 and a disk provided for the other boring bar assembly. In addition to the above, grooves of various configurations may be formed in each bushing by changing the speed of rotation of the tools associated with the boring bar assemblies with reference to the speed of reciprocation thereof. Furthermore, the present construction permits forming two grooves of different configuration in the same bushing by independently adjusting the movements of the tools associated with the boring bar assemblies. In other words, one of the boring bar assemblies may be simultaneously rotated and reciprocated, while the other boring bar assembly may be either rotated or reciprocated. In this connection, it will be apparent that one of the boring bars may be merely rotated, while the other boring bar merely reciprocated so as to form the type of groove illustrated in Figure 40. In view of the above, it follows that numerous different types of grooves may be formed in the bushings by merely varying the paths of travel of both the boring bar assemblies or by varying the path of travel of one of the latter relative to the other.

In Figures 31 to 33, inclusive, of the drawings, we have shown an attachment 260 for drilling an opening through the work in communication with the groove previously formed therein by the first boring station F. The attachment 260 is capable of being substituted for the milling attachment 200 hereinbefore described and is more or less of conventional design comprising a drive shaft 261 having a pulley 262 thereon operatively connected to a suitable source of power through the medium of a belt 263. Fixedly mounted upon the drive shaft 261 adjacent the pulley 262 is a second pulley 264 operatively connected to a pulley 265 on the vertically extending spindle 266 by means of a belt 267. In accordance with conventional practice, the rotating spindle 266 is provided with a turret 268 for securing a drill or other suitable tool 269 in place. The mechanism for automatically reciprocating the rotating spindle 266 is not shown herein, but is of conventional design and is automatically operated in the present instance by means of the cam 65 for actuating the work feeding mechanism 53. In detail, the foregoing is accomplished by providing an extension 270 for the link 62 of the work feeding mechanism arranged to automatically actuate the trip 271 for controlling the spindle reciprocating mechanism in the attachment. With the construction as set forth above, it will be apparent that when the cam 65 assumes the position thereof shown in Figure 31, the same not only serves to move the plunger 56 inwardly to positively feed the bushings to the turret, but in addition functions to impart a reciprocatory movement to the drill 269. The remaining parts of the present embodiment of the invention are identical to the construction hereinbefore described with the exception that the linkage operatively connecting the cam 209 with the milling device in the latter construction is eliminated in the present modification.

While the machine set forth in the first embodiment of the invention is capable of merely forming simple grooves in the bushings by rendering one of the boring bar assemblies inoperative, nevertheless, we have shown in Figure 34 a machine designed expressly for this purpose. In detail, the machine shown in Figure 34 differs from the first embodiment of the invention in that it is provided with a second loading station 272 identical in construction and operation to the loading station A previously described in detail. The loading station 272 is arranged diametrically opposite the loading station A and may be substituted for the milling machine attachment 200 in the first embodiment of the invention in the event it is desired to convert the latter to a machine for forming simple grooves in the bushings.

For the purpose of simplicity, the second loading station 272 will be defined as an attachment for use in place of the milling device 200 in the machine featured in the first described form of this invention. In detail, the loading station 272 is provided with a feeding plunger 273 identical in construction to the feeding plunger 56 previously set forth and connected to the actuating means therefor through the medium of the linkage 274 for actuation as a unit therewith. In other words, movement of the feeding plunger 56 inwardly by the cam 65 effects a corresponding movement of the plunger 273 associated with the second loading station 272.

When two loading stations are employed as in Figure 34, a second abutment 275 is mounted upon the fixed part 101 of the machine diametrically opposite the abutment 100 so that both the clamps C on the turret B opposite the loading stations will be automatically actuated in dependence upon axial displacement of the turret in the same manner as set forth above. In other words, as the turret is moved axially rearwardly toward the stations, the two pins 100 and 275 will engage the adjacent clutch operating pins 96 to release the clamps associated therewith. On the other hand, movement of the turret to its outermost position will engage both the displaced pins 96 and cause the clamps to be actuated to grip the bushings. It will also be observed in connection with the present modification that means must be provided for transferring the bushing at the upper station 272 into the adjacent clamp on the turret. This is accomplished herein by forming an extension 276 on the sleeve 70 of the transfer device D. As will be observed from Figure 20, the extension 276 extends upwardly and is provided with a plunger 277 identical in construction to the plunger 79 in the first described form of the invention.

The two boring bar assemblies and actuating means therefor in the present modification are not only identical in construction to the assemblies F and H in the first described form of the invention, but are positioned relative to each other in the same manner as the latter assemblies. The remaining parts of the machine illustrated in Figure 34 are identical to the corresponding parts of the machine featured in Figure 4, with the result that each time the turret B in Figure 34 rotates one complete revolution, two bushings are formed. Thus, it will be apparent that when it is desired to form only a single groove in each bushing, production of the machine may be doubled by the addition of a relatively few simple parts. Inasmuch as the boring bar assemblies in the modification shown in Figure 34 are identical to the corresponding parts of the first described form of the invention, it will be noted that the former are also capable of the same adjustments as the latter so that bushings may be formed in accordance with two different specifications simultaneously. In other words, the movement of the boring bar assembly F in Figure 34 may be determined to form a groove of one type in the bushing, while the movement of the boring bar assembly H may be selected to form a different type of groove in a bushing.

Although several embodiments of the invention have been specifically described herein, nevertheless, it is to be noted that the invention is extremely flexible, and numerous combinations may be resorted to without departing from the spirit and scope thereof. Accordingly, reservation is made to make such changes as may come within the purview of the accompanying claims.

What we claim as our invention is:

1. In a metal working machine, the combination with a tool holder having a tool associated therewith and a device for supporting the work in operative relation to the tool holder, of means for simultaneously reciprocating and rotating the tool holder relative to the work, and means automatically operable during the aforesaid movement of the tool holder for gradually feeding the tool holder in a direction transverse to the axis of rotation of the same to increase the depth of cut of the tool and for quickly moving the tool holder in a direction away from the work after a predetermined interval of operation thereof.

2. In a metal working machine, the combination with a tool holder having a tool associated therewith and a device for supporting the work in operative relation to the tool holder, of means for reciprocating the tool holder relative to the work, and means for automatically feeding the tool holder in a direction transverse to the path of reciprocation of the tool holder to increase the depth of cut of the tool and for withdrawing the tool from the work after a predetermined interval of operation thereof.

3. In a metal working machine, the combination with a tool holder having a tool associated therewith and a device for supporting the work in operative relation to the tool holder, of means for actuating the tool holder to move the tool carried thereby across the surface of the work to be fashioned, means for automatically relatively moving the tool holder and work in a direction transverse to the path of movement aforesaid of the tool holder to gradually increase the depth of cut of the tool throughout movement of the same across the work and for relatively moving the tool holder and work in the opposite direction to disengage the tool from the work after a predetermined interval of operation of said tool.

4. In a metal working machine, the combination with a tool holder having a tool associated therewith and a device for supporting the work in operative relation to the tool holder, of means for actuating the tool holder to move the tool carried thereby across the surface of the work to be fashioned, means for automatically relatively moving the tool holder and work in a direction transverse to the path of movement aforesaid of the tool holder to gradually increase the depth of cut of the tool throughout movement of the same across the work and for relatively moving the tool holder and work in the opposite direction to disengage the tool from the work after a predetermined interval of operation thereof, and means operable independent of said second named means to periodically relatively move the tool holder and work in both the aforesaid directions to disengage the tool from the work and to subsequently reengage the tool with the latter.

5. In a metal working machine, the combination with a tool holder having a tool associated therewith and a device for supporting the work in operative relation to the tool holder, of means for actuating the tool holder to move the tool across the surface of the work to be fashioned, cam means for gradually relatively moving the tool holder and work in a direction to increase the depth of cut of the tool during its path of travel across the work, and a kick-out cam for periodically rendering the aforesaid cam means inoperative.

6. In a metal working machine, the combination with a tool holder having a tool associated therewith and a device for supporting the work in operative relation to the tool holder, of means for actuating the tool holder to move the tool across the surface of the work to be fashioned, cam means for gradually feeding the tool holder in a direction to increase the depth of cut of the tool as the latter is moved across the work by said first named means and for also periodically moving the tool holder in the opposite direction to disengage the tool from the work, and a kick-out cam operable independent of the aforesaid cam means to disengage the tool from the work at predetermined intervals.

7. A metal working machine having a tool holder mounted for both rotation and radial movement relative to the work, means for rotating the tool holder, means for gradually moving the tool holder radially in a direction to feed the tool carried thereby into the work, means for automatically moving the tool holder in the opposite direction after a predetermined interval of operation of said second named means to withdraw the tool from the work, and means operable during the interval of operation of said second named means to periodically effect a withdrawal of the tool from the work.

8. In a machine for grooving bushings, the combination with a boring bar insertable into a bushing and a device for supporting a bushing in operative relation to the boring bar, of means for actuating the boring bar to move the tool carried thereby across the inner surface of the bushing to groove the same, cam means for gradually moving the boring bar radially in a direction to increase the depth of cut of the tool and for automatically withdrawing the tool from the work after a predetermined interval of operation thereof, and additional cam means operable during the aforesaid interval of operation of the feeding means to periodically effect a movement of the boring bar inwardly to withdraw the tool carried thereby from engagement with the bushing and to return the tool into engagement with the work.

9. In a metal working machine, the combination with a tool holder and a device for supporting a tool in operative relation to the holder, of means for actuating the holder to move the tool carried thereby across the surface of the work to be fashioned, means for simultaneously moving the tool in a direction to gradually increase the depth of cut of the latter and for withdrawing the tool from the work after a predetermined interval of operation of the same, and means operable upon withdrawal of the tool from the work to automatically move the work holder in a direction away from the tool holder.

10. In a metal working machine, a boring bar assembly having a rotatable shaft, a tool holder rotatable as a unit with said shaft and mounted for reciprocation in directions transverse to the axis of the shaft, means for reciprocating the tool holder in the aforesaid direction relative to the shaft including a reciprocable plunger, a cam engageable with one end of the plunger developed to effect a gradual movement of the same in one direction and a movement in the other direction at a relatively fast rate, and means operatively connecting the plunger to the tool holder for transferring the movement of the former to a corresponding movement of the latter.

11. In a metal working machine, a boring bar assembly mounted for rotation and comprising, a tool holder reciprocable in directions transverse to the axis of rotation thereof, a reciprocatory plunger having one end operatively connected to the rotatable tool holder whereby movement of the plunger effects a corresponding movement of the tool holder relative to the axis aforesaid of rotation, means engageable with the plunger for reciprocating the same including a cam developed to effect a gradual movement of the plunger in one direction at a relatively faster movement of the same in the opposite direction, and a second cam also engageable with the plunger and operable to effect a movement of the same in the last named direction irrespective of the position of the cam aforesaid.

12. In a metal working machine, a boring bar assembly comprising, a shaft mounted for both reciprocation and rotation, a tool holder movable as a unit with the shaft and mounted upon the latter for an additional movement transverse to the axis of the shaft, and means for automatically moving the tool holder in the aforesaid direction thereof at a predetermined rate during rotation and reciprocation of the same by the shaft.

13. In a machine for grooving bushings, the combination with a boring bar insertable into a bushing and a device for supporting the bushings in operative relation to the boring bar, of means for actuating the boring bar to move the tool thereof across the surface of the bushing to be grooved, means for simultaneously moving the boring bar radially outwardly relative to the bushing at a predetermined rate to increase the depth of cut of the tool, means for moving the boring bar inwardly to withdraw the tool from the bushing after a predetermined interval of operation thereof, and means operable prior to the completion of the interval of operation of the second named means to periodically withdraw the tool carried by the boring bar from and return the same into engagement with the bushing for forming interrupted grooves in the latter.

14. In a machine for grooving bushings, a plurality of boring bar assemblies, means for actuating the latter to move the tools carried thereby throughout paths of travel determined in dependence upon the configuration of the grooves desired in the bushings, a device for supporting a bushing in operative relation to the tool carried by one of the assemblies, means operable in timed relation to the operation of the aforesaid boring bar assembly to move the bushing grooved thereby in operative relation to another boring bar assembly to form a compound groove in the bushing, and means for independently varying the paths of travel of the tools carried by both the above boring bar assemblies whereby grooves of different configuration may be formed in the same bushing.

15. In a machine for grooving bushings, a plurality of boring bar assemblies mounted in spaced relation to each other, means for actuating the boring bar assemblies to move the tools carried thereby throughout predetermined paths of travel determined in dependence upon the configuration of the grooves desired in the bushings, and means for successively positioning bushings in operative relation to the boring bar assemblies.

16. In a machine for grooving bushings, the combination with a boring bar assembly having a tool associated therewith and a device for holding a plurality of bushings in predetermined spaced relationship with one of the bushings in operative relation to the boring bar assembly, of means for actuating the boring bar assembly to move the tool carried thereby across the surface of the bushing in registration therewith, means for simultaneously moving the tool radially outwardly relative to the bushing to gradually increase the depth of cut of the tool, means for withdrawing the tool from the bushing after a predetermined interval of operation thereof, and means operable in timed relation to said last named means for indexing the device to successively bring the remaining bushings thereon into operative relation to the boring bar assembly.

17. In a metal working machine, the combination with a support for the articles to be operated upon, of a turret having a plurality of spaced clamps thereon and normally arranged in a position adjacent the support, means for periodically moving said turret away from the support and back to a position adjacent the latter, means operable in timed relation to the operation of the aforesaid means for indexing the turret to successively position the clamps opposite said support, means operable upon movement of the turret toward the support to automatically release the clamp opposite the support, means for automatically transferring an article from the support into the released clamp aforesaid, and means operable in dependence upon movement of the turret away from the support to automatically actuate the latter clamp to secure the article therein.

18. In a metal working machine, a work holder for the articles to be operated upon, a boring bar positioned adjacent the holder and having a tool for forming a groove in an article carried by the holder, means for actuating the bar to move the tool carried thereby through a predetermined path of travel, means operable during the interval of operation of the aforesaid means for automatically feeding the tool in a direction to increase the depth of cut of the latter at a predetermined rate and for subsequently withdrawing the tool from the article, and means for controlling the action of said bar to change the path of travel of the tool and thereby vary the configuration of groove formed in the article.

19. In a metal working machine, a work holder for the articles to be operated upon, a boring bar positioned adjacent the holder and having a tool for forming a groove in an article carried by the holder, means for actuating the bar to move the tool carried thereby through a predetermined path of travel, means operable during the interval of operation of the aforesaid means for automatically feeding the tool in a direction to increase the depth of cut of the latter at a predetermined rate and for subsequently withdrawing the tool from the article, means for controlling the action of said bar to change the path of travel of the tool and thereby vary the configuration of groove formed in the article, and means operable at predetermined intervals during the operation of said feeding means for withdrawing the tool from and returning the same into engagement with the article for forming interrupted grooves in the latter.

20. In a metal working machine, a turret having a plurality of spaced clamps thereon for receiving articles to be operated upon, a boring bar positioned adjacent the turret and having a tool for forming a groove in the articles carried by the turret, means for actuating the bar to move the tool carried thereby throughout a predetermined path of travel, means operable during the interval of operation of the aforesaid means for automatically feeding the tool in a direction to increase the depth of cut of the latter and for subsequently withdrawing the tool from the work, means operable in timed relation to withdrawing the tool from the article for relatively moving the boring bar and turret away from each other, and means for automatically indexing the turret in timed relation to the operation of said last named means to introduce the next adjacent unfinished article to the boring bar.

21. In a metal working machine, a turret having a plurality of spaced clamps thereon for holding articles to be operated upon, a pair of boring bar assemblies spaced from each other and positioned adjacent the turret for forming grooves in the articles carried by the turret, means for actuating both the boring bar assemblies to move the tools carried thereby throughout a predetermined path of travel, and means for automatically indexing the turret to successively position the articles carried thereby in operative relation to both the boring bar assemblies for forming a compound groove in each article.

22. In a metal working machine, a turret having a plurality of spaced clamps thereon for holding articles to be operated upon, a pair of boring bar assemblies spaced from each other and positioned adjacent the turret for forming grooves in the articles carried by the turret, means for actuating both the boring bar assemblies to move the tools carried thereby throughout a predetermined path of travel, means for automatically indexing the turret to successively position the articles carried thereby in operative relation to both the boring bar assemblies for forming a compound groove in each article, and means for independently changing the paths of travel of each boring bar.

23. In a metal working machine, a turret having a plurality of spaced clamps thereon for receiving articles to be operated upon, a pair of boring bars spaced from each other and positioned adjacent the turret for forming grooves in the articles carried thereby, means for actuating each boring bar assembly to move the tools carried thereby through predetermined paths of travel, means operable during the interval of operation of the aforesaid means for automatically feeding the tools carried by the boring bar assemblies in a direction to increase the depth of cut of the latter and for subsequently withdrawing the tools from the articles, and means for automatically indexing the turret upon withdrawing the tools from the work.

24. In a metal working machine, a pair of boring bar assemblies arranged in spaced relation to each other and each having a tool associated therewith for forming grooves in articles, a work holder for supporting a pair of articles in operative relation with the boring bar assemblies, means for actuating both boring bar assemblies to move the tools carried thereby through predetermined paths of travel, means operable during the interval of operation of the aforesaid means for automatically feeding the tools in a direction to increase the depth of cut of the latter and for subsequently withdrawing the same from the articles, and means associated with each boring bar assembly and operable independent of each other at predetermined intervals during the operation of said feeding means for withdrawing the tool from and returning the same into engagement with the article.

25. In a metal working machine, the combination with a tool supporting member and a device having means for holding the work in operative relation to the tool, of means for moving the tool throughout a predetermined path across a surface of the work, means for gradually feeding the tool in a direction to increase the depth of cut and for moving the tool away from the surface aforesaid of the work after a predetermined interval of operation thereof, and means operable in timed relation to movement of the tool away from said surface for bodily moving said device in a direction to space the work from the tool.

26. In a metal working machine, the combination with a tool holder having a tool secured thereto and a device for supporting the work in operative relation to the tool holder, of means for actuating the tool holder to move the tool throughout a predetermined path of travel across a surface of the work, means for gradually feeding the tool in a direction toward the surface to increase the depth of cut and for moving the tool away from said surface after a predetermined interval of operation thereof, and means operable in timed relation to movement of the tool away from said surface for relatively moving the tool holder and said device.

27. In a metal working machine, the combination with a support for the articles to be operated upon and a device having a work clamp associated therewith adapted to assume a position opposite said support, of means for relatively moving the device and support toward and away from each other, means for releasing the clamp in timed relation to the aforesaid relative movement of the support and device, and means operable in dependence upon releasing said clamp to automatically transfer an article from the support to a position within the clamp.

28. In a metal working machine, a plurality of stations spaced from each other and operable to form grooves in a corresponding number of articles, loading stations alternately arranged with respect to the grooving stations, a member having a plurality of work holding clamps thereon corresponding in number to the number of stations aforesaid and so located with respect to the stations as to position an article opposite each station in each operative position of the member, means for actuating the grooving stations to form a groove in the articles in registration therewith, means for inserting articles to be grooved into the clamps in registration with the grooving station, and means for subsequently moving said member to advance the latter articles into registration with the grooving stations.

29. In a metal working machine, a plurality of stations operable to form grooves in a corresponding number of articles, loading stations alternately arranged with respect to the grooving stations, a rotatable turret having a plurality of work holding clamps corresponding in number to the number of stations and so located with respect to the latter as to position an article in registration with each station in rotative position of the turret, means for simultaneously actuating the grooving stations to form grooves in the articles in registration therewith, means operable in timed relation to the actuation of the grooving stations for inserting an article in each of the work holding clamps carried by the turret, means subsequently operable to rotate the turret to position the last named articles opposite the grooving stations and to advance the finished articles into registration with the loading stations.

30. In a machine of the class described, the combination with a device for supporting a bushing and a boring bar insertable into the bushing, of means for actuating the boring bar to move a tool carried thereby across the inner surface of the bushing to groove the same, including a shaft mounted for both rotary and longitudinal movement, said shaft and bar being in alignment, and means for moving the boring bar radially of the bushing to vary the depth of the groove, including a holder for the bar mounted for radial sliding movement over an end of said shaft.

31. In a metal working machine, the combination with a work holder, of a rotary turret having a plurality of peripherally spaced work clamps, means for bodily moving the turret axially toward and away from the holder, means operable automatically in timed relation to axial movement of the turret to rotate the turret to align one of the clamps with said holder, means operable automatically to release the aligned clamp upon axial movement of the turret toward the holder, and means operable automatically in timed relation to axial movement of the turret toward the support for transferring work from the latter to the clamp.

32. In a machine of the class described, a shaft mounted for rotary and longitudinal movement, a boring bar at one end of said shaft, and a driving connection between the shaft and bar including a reciprocating member carried by and disposed at right angles to the axis of the shaft, and a holder for the bar carried by said member.

33. In a machine of the class described, a shaft mounted for rotary and longitudinal movement, a tool holder mounted for radial sliding movement over an end of the shaft, and means operable while the shaft is moving for moving the holder.

34. In a metal working machine, the combination with a boring bar and a device for holding work in operative relation to the bar, of means for rotating said bar, means for simultaneously reciprocating said bar, means for varying the speed of one of the aforesaid movements of the bar to change the path of travel of the latter, and means whereby either of said first or second named means may be rendered inoperative to effect still a further variation in the path of travel of the bar.

35. In a metal working machine, a plurality of boring bar assemblies mounted in spaced relation to each other, means for actuating the boring bar assemblies to move the tools carried thereby throughout predetermined paths of travel, and means for successively positioning work pieces in operative relation to the boring bar assemblies.

36. In a metal working machine, a plurality of boring bar assemblies mounted in spaced relation to each other and carrying tools, means for successively positioning work pieces in operative relation to the tools of the boring bar assemblies, and means for independently varying the paths of travel of the tools carried by the boring bar assemblies whereby grooves of different configurations may be formed in the same work piece.

37. In a metal working machine, a plurality of spaced boring bars carrying tools, means for successively positioning work pieces in operative relation to the boring bar assemblies, means for rotating each boring bar, means for simultaneously reciprocating each of said bars, and means associated with each bar to vary the speed of one of the aforesaid movements of the bar independent of the other bar.

38. In a metal working machine, a plurality of spaced boring bars carrying tools, means for successively positioning work pieces in operative relation to the boring bar assemblies, means for rotating each boring bar, means for simultaneously reciprocating each of said bars, and means also associated with each bar to render either said rotating or reciprocating means inoperative.

39. In a metal working machine, a boring bar assembly comprising a rotatable shaft having a tubular portion, a tool holder mounted at one end of the tubular portion of the shaft for sliding movement radially of the axis of said shaft and connected to the latter for rotation therewith as a unit, a rock arm housed within the tubular portion of the shaft and pivotally supported on the latter intermediate the ends for rocking movement about an axis transverse to the axis of the shaft, an operative connection between one end of the rock arm and tool holder for moving the latter radially of the shaft upon rocking said arm, and means operatively connected to the other end of said arm for rocking the same.

40. In a metal working machine, a boring bar assembly comprising a shaft having a tubular end portion, means for simultaneously rotating and reciprocating said shaft, a tool holder mounted upon said shaft at the end of the tubular portion thereof for radial sliding movement relative thereto and for rotation and reciprocation as a unit with the same, a rock arm housed within the tubular end portion of the shaft and pivotally mounted on the latter for rocking movement about an axis transverse to the axis of the same, an operative connection between one end of the rock arm and tool holder, and cam means connected to the opposite end of the rock arm for periodically oscillating the same during the aforesaid movement of the shaft.

41. In a metal working machine, a boring bar assembly comprising a shaft having a tubular end portion and mounted for reciprocation, a tool holder mounted upon said shaft at the tubular end thereof for reciprocation radially of the shaft and for movement with the latter as a unit, a rock arm housed within the tubular end portion of the shaft and pivotally mounted on the latter for swinging movement about an axis extending transverse to the axis of the shaft, an operative connection between one end of the rock arm and tool holder whereby rocking movement of said arm effects a radial sliding movement of the tool holder relative to the shaft, and means operatively connected to the opposite end of the arm for rocking the same during reciprocation of said shaft.

42. In a metal working machine, a boring bar assembly comprising a shaft having a tubular end portion, a tool holder mounted upon the shaft at the tubular end thereof for reciprocation radially of the shaft, a rock arm housed within the tubular portion of the shaft and pivotally mounted on the latter for swinging movement about an axis extending transverse to the axis of the shaft, an operative connection between one end of the rock arm and tool holder whereby rocking said arm in opposite directions effects a reciprocation of the tool holder, cam means operatively connected to the opposite end of the rock arm for reciprocating the tool holder, and additional means operable independent of the aforesaid cam means to move the tool holder in one direction.

43. In a metal working machine, a boring bar assembly having a boring bar mounted for reciprocation, means for reciprocating said boring bar including a crank shaft having a crank pin mounted for adjustment with respect to the axis of rotation of the shaft, and a connection between the pin and boring bar whereby the aforesaid adjustment of said pin varies the stroke of said bar.

44. In a metal working machine, a work holding turret carrying a clamp having relatively movable sections, an arm pivotally mounted upon the turret and having a portion secured to one section of the clamp, an actuating lever for the arm having one end portion yieldably urged into engagement with the arm tending to move the section of the clamp carried by the arm toward the cooperating section of the clamp, and cam means cooperating with the opposite end of the lever for operating the latter to relieve the action of the same on the arm.

45. In a metal working machine, a work holding turret carrying a clamp having relatively movable cooperating sections, means for swinging one of the sections toward and away from the other including an arm pivotally supported upon the turret, an actuating lever for the arm having a portion adjacent one end engaging the arm, spring means cooperating with the latter end of the lever for yieldably maintaining said end portion into engagement with the arm and thereby urge the section of the clamp carried by the arm toward the cooperating section, and cam means associated with the opposite end of the lever cooperating with the spring means in one position thereof to relieve the portion aforesaid of the lever from engagement with the arm.

46. In a metal working machine, a work holding turret mounted for reciprocation and carrying a clamp having cooperating sections, means for swinging one section of the clamp toward and away from the cooperating section including an arm pivotally mounted upon the turret, and means responsive to the reciprocation of said turret for operating said arm.

47. In a metal working machine, a work holding turret mounted for reciprocation and carrying cooperating relatively movable sections, means for swinging one of the sections of the clamp toward and away from the cooperating section including an arm pivotally supported upon the turret, and means operable in dependence upon movement of the turret in one direction to swing the section aforesaid of the clamp away from the cooperating section thereof and upon movement of the turret in the opposite direction to swing the first named section of the clamp toward said cooperating section.

48. In a metal working machine, a work holding turret mounted for reciprocation and carrying a clamp having cooperating sections, means for swinging one of the sections toward and away from the cooperating section, including an arm pivotally supported upon the turret, an actuating lever for the arm having a portion adjacent one end engaging the arm to form a fulcrum therefor, spring means acting upon the end aforesaid of the arm for normally maintaining the fulcrum into engagement with the arm to urge the section of the clamp carried by the latter toward the cooperating section of the clamp, and means engaging the opposite end of the actuating lever cooperating with the spring means and responsive to the reciprocation of the turret for actuating said lever.

49. In a metal working machine, the combination with a support for work, of a turret mounted for rotary and axial movement relative to said support, a work clamp carried by the turret and adapted upon rotary movement of the turret to assume a position opposite said support, and means for moving the clamp so as to alternately grip and release the work including means movable axially of said turret upon axial movement thereof.

50. In a metal working machine, the combination with a support for the work, of a turret mounted for rotary and axial movement relative to said support, a work clamp carried by said turret and adapted upon rotary movement of the turret to assume a position opposite said support, and actuating means for the work clamp including means movable axially of the turret, said means being operable upon axial movement of the turret toward the support to actuate the work clamp to release the work, said means being operable upon axial movement of the turret from the support to actuate the work clamp to grip the work.

51. In a machine of the class described, the combination with a work holder, of a shaft in alignment with and mounted for both rotary and longitudinal movements relative to said holder, a cutting tool at one end of said shaft engageable with work in said holder, a holder for said tool mounted for radial sliding movement over the end aforesaid of said shaft, and actuating means for said tool holder including parts carried by said shaft, one of said parts being a yieldable element, and the other of said parts being a pivotally mounted element.

52. In a machine, a turret, work clamps carried by said turret, a work conveyor, and means for transferring work from the conveyor to the work clamps carried by said turret including mechanism mounted for reciprocation axially of the turret and operable in timed relation to the actuation of the turret.

53. In a machine, a work chute, and means for advancing work in said chute including a plunger movable longitudinally of the chute, a rotating shaft, a cam on said shaft, and a driving connection between said cam and plunger including a bell crank lever, a roller carried by one arm of said lever and engaging said cam, a second bell crank lever, a link terminally connected to another arm of the first lever and to an arm of the second mentioned lever, and linkage connecting another arm of the second lever to said plunger, the link aforesaid being adjustable to vary the throw of said plunger.

54. In a machine, a shaft, a turret on said shaft, work clamps carried by said turret, a work chute, and means for transferring work from the chute to the clamps on the turret including a sleeve mounted for reciprocation on said shaft, a yoke carried by said sleeve, and a plunger carried by an arm of said yoke and engageable with work in the chute.

55. In a machine, a turret, and work holding means carried by said turret including a clamp having a fixed jaw and a cooperating movable jaw, an arm pivotally mounted on the turret and carrying the movable jaw, means engaging the arm and urging the movable jaw toward the fixed jaw, said means being yieldable to permit work to be received between said jaws, and means for forcibly moving the movable jaw toward the fixed jaw to clamp the work, including a plunger, a lever pivotally connected at one end to said plunger and having a cam portion engageable with the arm aforesaid, and a spring for actuating said plunger.

56. In a machine, a turret, and work holding means carried by said turret including a clamp having a fixed jaw and a cooperating movable jaw, an arm pivotally mounted on the turret and carrying the movable jaw, means engaging the arm and urging the movable jaw toward the fixed jaw, said means being yieldable to permit work to be received between said jaws, means for forcibly moving the movable jaw toward the fixed jaw to clamp the work including a plunger, a lever pivotally connected at one end to said plunger and having a portion engageable with the arm aforesaid, a spring for actuating said plunger, and an adjustable stop for said spring, the adjustment of said stop relative to said plunger determining the force exerted by the lever against the supporting arm for the movable clamp.

57. In a machine, a turret, and work holding means carried by said turret including a clamp having a fixed jaw and a cooperating movable jaw, an arm pivotally mounted on the turret and carrying the movable jaw, means engaging the arm and urging the movable jaw toward the fixed jaw, said means being yieldable to permit work to be received between said jaws, and means for forcibly moving the movable jaw toward the fixed jaw to clamp the work, including a plunger, a lever pivotally connected at one end to said plunger and having a portion engageable with the arm aforesaid, a spring for actuating said plunger, a roller carried by said lever, and means for actuating the lever including a pin mounted for reciprocation axially of the turret, said pin being provided with a cam surface for engaging and a recess for receiving the roller carried by said lever.

58. In a machine, a turret, and work holding means carried by said turret including a clamp having a fixed jaw and a cooperating movable jaw, an arm pivotally mounted on the turret and carrying the movable jaw, means engaging the arm and urging the movable jaw toward the fixed jaw, said means being yieldable to permit work to be received between said jaws, and means for forcibly moving the movable jaw toward the fixed jaw to clamp the work, including a plunger, a lever pivotally connected at one end to said plunger and having a portion engageable with the arm aforesaid, a spring for actuating said plunger, a roller carried by said lever, and means for actuating the lever including a pin mounted for reciprocation axially of the turret, said pin being provided with a cam surface for engaging and a recess for receiving the roller carried by said lever, relatively stationary members upon opposite sides of the turret in the path of opposite ends of the pin, one end of the pin being engageable with one of said members upon movement of the turret in one direction, and an element carried by the other of said members and engageable by the other end of said pin upon movement of the turret in the opposite direction.

59. In a machine, a turret, and work holding means carried by said turret including a clamp having a fixed jaw and a cooperating movable jaw, an arm pivotally mounted on the turret and carrying the movable jaw, means engaging the arm and urging the movable jaw toward the fixed jaw, said means being yieldable to permit work to be received between said jaws, and means for forcibly moving the movable jaw toward the fixed jaw to clamp the work, including a plunger, a lever pivotally connected at one end to said plunger and having a portion engageable with the arm aforesaid, a spring for actuating said plunger, a roller carried by said lever, and means for actuating the lever including a pin mounted for reciprocation axially of the turret, said pin being provided with a cam surface for engaging and a recess for receiving the roller carried by said lever, relatively stationary members upon opposite sides of the turret in the path of opposite ends of the pin, one end of the pin being engageable with one of said members upon movement of the turret in one direction, and an element carried by the other of said members and engageable by the other end of said pin upon movement of the turret in the opposite direction, said element being adjustable whereby the movement of the pin aforesaid may be varied.

60. In a machine, a pair of spaced relatively stationary members, a turret shiftable axially between said members, work holding means carried by said turret and including a movable jaw, and actuating means for said jaw including means alternately engageable with said stationary members.

61. In a machine, a pair of spaced relatively stationary members, a turret shiftable axially between said members, work holding means carried by said turret and including a movable jaw, and actuating means for said jaw including longitudinally movable means extending substantially axially of said turret and alternately engageable with said stationary members.

62. In a machine, a pair of spaced relatively stationary members, a turret shiftable axially between said members, work holding means carried by said turret and including a movable jaw, and actuating means for said jaw including a pivotally mounted lever, and means alternately engageable with said stationary members for controlling the action of said lever.

63. In a machine, a reciprocating shaft, and means for reciprocating said shaft including a bushing on the shaft having rack teeth, a segmental pinion meshing with said rack teeth, a crank shaft having a crank pin, said pin having a slotted connection with the cheek of the crank shaft so as to permit the throw of the crank pin to be varied, and a sectional connecting rod terminally connected to said pin and segmental pinion, the adjacent ends of said sections being adjustably secured together so as to provide for locating the stroke of the reciprocating shaft.

64. In a machine, a reciprocating shaft, and means for reciprocating said shaft including a bushing on the shaft having rack teeth, a segmental pinion meshing with said rack teeth, a crank shaft having a crank pin, said pin being adjustable on the crank shaft relative to the axis thereof so as to permit the throw of the crank pin to be varied from zero to a predetermined maximum, and a sectional connecting rod terminally connected to said pin and segmental pinion, the adjacent ends of said sections being adjustably secured together so as to provide for locating the stroke of the reciprocating shaft.

65. In a machine, a boring bar assembly including a rotary shaft, and a tool holder projecting endwise from and mounted for radial sliding movement over an end of said shaft.

66. In a boring bar assembly, a rotary shaft, a plate mounted for radial sliding movement over an end of said shaft, and a tool holder in axial alignment with the shaft and adjustably mounted on said plate.

67. In a machine, a rotary shaft, a boring bar holder mounted for radial sliding movement over an end of said shaft, and actuating means for said holder including a rocker, a segmental pinion for actuating the rocker, a sleeve slidably mounted on the shaft and adapted to actuate the pinion, and a plunger for actuating said sleeve.

68. In a machine, a rotary shaft, a sleeve slidably mounted on said shaft shaft, a tool holder movable radially of said shaft, and actuating means for said holder including a pivotally mounted element actuable by said sleeve, and a rocker actuable by the pivotally mounted element.

69. In a machine, a rotary shaft, a tool holder mounted for radial sliding movement relative to said shaft, and actuating means for said holder including pivotally mounted means carried by the shaft, means movable longitudinally of said shaft for actuating the pivotally mounted means, a plunger disposed at substantially right angles to the axis of said shaft, and a driving connection between the plunger and longitudinally movable means affording unobstructed rotation of said shaft.

70. In a machine, a rotary shaft, a tool holder mounted for radial sliding movement relative to said shaft, and means for sliding the holder including a plunger, a rocker arm carried intermediate its ends by said plunger, rollers carried by said rocker arm at opposite ends thereof, and a pair of laterally spaced rotary cams engaging said rollers, one for each roller.

71. In a machine, a slidably mounted tool holder, and means for sliding said holder including a plunger, a pair of laterally spaced rotary cams, and driving connections between the cams and plunger including a rocker arm pivoted intermediate its ends on the plunger, and rollers carried by the rocker arm at opposite ends thereof and engaging said cams.

72. In a machine, a turret, work holding means carried by the turret, a milling cutter engageable with work in said holding means, a shaft for the cutter, a bracket carrying said shaft and movable relative to said turret to engage and disengage the cutter with work in said holding means, a drive shaft operatively connected to the cutter shaft, and means operable automatically in timed relation to the movement of the turret for moving said bracket.

73. In a machine of the class described, an axially shiftable turret, work holding means carried thereby and including a movable jaw, and actuating means for the jaw including a lever carried by the turret and provided with an anti-friction element, and a member extending transversely of said turret and having longitudinally spaced portions successively engageable with said anti-friction element.

74. In a machine, a turret, and work holding means carried by said turret including a clamp having a fixed jaw and a cooperating movable jaw, an arm pivotally mounted on the turret and carrying the movable jaw, and means engaging the arm and urging the movable jaw toward the fixed jaw, said means being yieldable to permit work to be received between said jaws.

75. In a machine of the class described, an axially shiftable turret, work holding means carried thereby and including a movable jaw, and actuating means for the jaw including a lever carried by the turret and provided with an anti-friction element, and a pin mounted for reciprocation axially of the turret, said pin being provided with a cam surface for engaging and a recess for receiving the anti-friction element, relatively stationary members upon opposite sides of the turret in the path of opposite ends of said pin, one end of the pin being engageable with one of said members upon movement of the turret in one direction, and an element carried by the other of said members and engageable by the other end of said pin upon movement of the turret in the opposite direction.

76. In a machine, a turret, and work holding means carried by said turret including a clamp having a fixed jaw and a cooperating movable jaw, an arm pivotally mounted on the turret and carrying the movable jaw, and means for moving the movable jaw toward the fixed jaw to clamp the work including a plunger, a lever pivotally connected at one end to said plunger and having a portion engageable with the arm aforesaid, an anti-friction element carried by said lever, and means for actuating the lever including a pin mounted for reciprocation axially of the turret, said pin being provided with a cam surface for engaging and a recess for receiving the anti-friction element carried by said lever.

77. In a machine, a turret, work holding means carried thereby and including a movable jaw, and actuating means for the jaw including an axially movable member extending transversely of said turret, and means under the control of said member and operatively connected to said jaw.

78. In a machine, an axially shiftable turret, work holding means carried thereby and including a movable jaw, and actuating means for the jaw including a pivotally mounted lever, and a member extending transversely of said turret and operable upon axial movement of the turret to move said lever.

79. In a machine, a main shaft mounted for both rotary and longitudinal movements, means including a crank shaft and a crank pin for reciprocating said main shaft, and means including a gear non-rotatively connected to the main shaft for rotating said main shaft, the crank pin being movable to a position in alignment with the axis of the crank shaft to render the crank shaft inoperative to reciprocate the main shaft, and the gear being removable from the main shaft to restrict the main shaft to a longitudinal movement.

80. In a machine, a main shaft mounted for both rotary and longitudinal movements, means including a crank shaft and a crank pin for reciprocating said main shaft, and means operable while the main shaft is reciprocating for rotating said main shaft, said last mentioned means including a driving gear, and a gear meshing with the driving gear and non-rotatively connected to the main shaft, the crank pin being movable to a position in alignment with the axis of the crank shaft to render the crank shaft inoperative to reciprocate the main shaft, and the last mentioned gear being removable from the main shaft and out of mesh with the driving gear to restrict the main shaft to a longitudinal movement.

81. In a machine, a boring bar assembly including a shaft mounted for both rotary and longitudinal movements, one end of said shaft being hollow, a member mounted for radial sliding movement over the hollow end of said shaft, a tool holder carried by said member, and actuating means for said holder including pivotally mounted means within the hollow end of said shaft and operatively connected to said member.

82. In a boring bar assembly, a rotary shaft, a plate mounted for radial sliding movement over an end of said shaft, a tool holder adjustably mounted upon and projecting from one side of said plate in axial alignment with said shaft, and actuating means for the holder including a rocker carried by the shaft and operatively connected to said plate.

83. In a boring bar assembly, a rotary shaft having an enlarged head, a plate mounted for radial sliding movement in said head, a tool holder in axial alignment with the shaft and carried by said plate, and actuating means for the holder including a spring in said head engaging an edge of said plate, and a pivotally mounted member carried by said shaft and engaging one side of said plate.

84. In a boring bar assembly, a rotary shaft having an enlarged head, a plate mounted for radial sliding movement in said head, a tool holder projecting from one side of said plate, and actuating means for the holder including a spring in said head engaging an edge of said plate, and a pivotally mounted member carried by the shaft and engaging the other side of said plate.

85. In a machine, a rotary shaft having a hollow section, a member mounted for radial sliding movement over an end of said hollow section, a tool holder carried by said member, and actuating means for said holder including a rocker within the hollow section and operatively connected to said member, a segmental pinion connected to the rocker and having a cam portion projecting radially through a wall of said section, and a sleeve slidably mounted on the shaft and engageable with the cam portion of the pinion.

86. In a machine of the class described, a shaft mounted for rotary and longitudinal movement and having a tubular section, a member mounted for radial sliding movement over an end of said tubular section and having teeth, a tool holder carried by said member, means for rotating said shaft, means operable while the shaft is rotating for moving the shaft longitudinally, and means operable during movement of the shaft for sliding the tool holder including an elongated rocker within the tubular section of said shaft and having teeth engaging the teeth aforesaid of said member.

87. In a machine of the class described, a shaft mounted for rotary and longitudinal movement, a member mounted for radial sliding movement over an end of said shaft and having teeth, a tool holder carried by said member, means for rotating said shaft, means operable while the shaft is rotating for moving the shaft longitudinally, and means operable during movement of the shaft for sliding the tool holder, including a pivotally mounted element having teeth, and an elongated rocker within said shaft and having teeth at opposite ends thereof engaging the teeth of said member and pivotally mounted element.

88. In a machine of the class described, a shaft mounted for rotary and longitudinal movement, a member mounted for radial sliding movement over an end of said shaft and having teeth, a tool holder carried by said member, and means operable during movement of the shaft for sliding the tool holder, including a pivotally mounted element having teeth, and an elongated rocker pivoted intermediate its ends and having teeth at opposite ends thereof engaging the teeth of said member and pivotally mounted element.

89. In a machine of the class described, a shaft mounted for rotary and longitudinal movement, a member mounted for radial sliding movement over an end of said shaft, a tool holder adjustably mounted on said member, and actuating means for said tool holder including means within said shaft operatively connected to said member.

90. In a machine of the class described, a shaft mounted for rotary and longitudinal movement, a member mounted for radial sliding movement over an end of said shaft, a tool holder carried by said member, and actuating means for the tool holder including means within said shaft operatively connected to said member.

91. In a machine of the class described, a shaft mounted for rotary and longitudinal movement, a member mounted for radial sliding movement over an end of said shaft, a tool holder carried by said member, and actuating means for the tool holder including a rocker within said shaft operatively connected to said member, a pivotally mounted element carried by said shaft and operatively connected to said rocker, and a member slidably but non-rotatively mounted on said shaft and engageable with said pivotally mounted element.

92. In a machine of the class described, a shaft mounted for rotary and longitudinal movement, a member mounted for radial sliding movement over an end of said shaft, a tool holder carried by said member, and actuating means for said tool holder including a pivotally mounted element operatively connected to said member, a pivotally mounted element operatively connected to the element just mentioned, a slidably mounted member non-rotatively mounted on said shaft and engageable with the last mentioned pivotally mounted element, a cam actuated reciprocable plunger, and a driving connection between said plunger and slidably mounted member.

93. In a machine of the class described, a rocker, a pivotally mounted member for moving said rocker, a slidable element for actuating the pivotally mounted member, a cam actuated plunger, and a bell crank lever actuable by the plunger for sliding said element.

94. In a machine of the class described, a rocker, a pivotally mounted member for rocking said rocker, a slidable element for actuating the pivotally mounted member, a cam actuated plunger, and pivotally mounted means for translating motion from said plunger to said slidable element.

GEORGE F. YAGER.
OLIVER J. HEATH.